US012646760B2

(12) United States Patent
Wujcik et al.

(10) Patent No.: US 12,646,760 B2
(45) Date of Patent: Jun. 2, 2026

(54) SOLID-STATE LITHIUM-ION BATTERY CELL CONDITIONING PROCESS AND COMPOSITION

(71) Applicant: Blue Current, Inc., Hayward, CA (US)

(72) Inventors: Kevin Wujcik, Berkeley, CA (US); Chaoyi Yan, Hayward, CA (US); Josephine Pedersen, Hayward, CA (US); Terri Lin, Hayward, CA (US); Eduard Nasybulin, Fremont, CA (US)

(73) Assignee: Blue Current, Inc., Hayward, CA (US)

( * ) Notice: Subject to any disclaimer, the term of this patent is extended or adjusted under 35 U.S.C. 154(b) by 0 days.

(21) Appl. No.: 17/735,954

(22) Filed: May 3, 2022

(65) Prior Publication Data

US 2022/0352565 A1 Nov. 3, 2022

Related U.S. Application Data

(60) Provisional application No. 63/201,524, filed on May 3, 2021.

(51) Int. Cl.
*H01M 10/44* (2006.01)
*H01M 4/04* (2006.01)
(Continued)

(52) U.S. Cl.
CPC ....... *H01M 10/446* (2013.01); *H01M 4/0447* (2013.01); *H01M 4/386* (2013.01); *H01M 4/483* (2013.01); *H01M 4/587* (2013.01); *H01M 4/622* (2013.01); *H01M 10/052* (2013.01); *H01M 10/0525* (2013.01); *H01M*
*10/058* (2013.01); *H01M 10/44* (2013.01); *H01M 50/411* (2021.01); *H01M 50/431* (2021.01); *H01M 50/446* (2021.01); *H01M 2004/027* (2013.01); *Y02E 60/10* (2013.01)

(58) Field of Classification Search
CPC .................................................... H01M 10/446
See application file for complete search history.

(56) References Cited

U.S. PATENT DOCUMENTS 4,828,945 A 5/1989 Nagata et al.
4,879,073 A 11/1989 Kromrey
(Continued)

FOREIGN PATENT DOCUMENTS

CN 101983444 A 3/2011
CN 104779415 A 7/2015
(Continued)

OTHER PUBLICATIONS

Machine English translation of DE-102019211857-B3 from Espacenet, originally published to Hippauf Nov. 12, 2020 (Year: 2020).*
(Continued)

*Primary Examiner* — Mary Grace Byram
(74) *Attorney, Agent, or Firm* — Weaver Austin Villeneuve & Sampson LLP

(57) ABSTRACT

Solid-state lithium-ion cells described herein can operate at pressures. In some embodiments, the solid-state lithium-ion cells undergo little or no volume change during cycling. A conditioning process that that significantly improves the performance of a cell at reduced pressures can involve cycling the cell at high pressure.

23 Claims, 12 Drawing Sheets

Provide uncycled solid-state lithium ion battery
101

Cycle battery at high pressure for one cycle
103

Optionally cycle battery at high pressure one or more times
105

Lower or remove applied pressure for operation
107

(51) Int. Cl.

| | |
|---|---|
| *H01M 4/38* | (2006.01) |
| *H01M 4/48* | (2010.01) |
| *H01M 4/587* | (2010.01) |
| *H01M 4/62* | (2006.01) |
| *H01M 10/052* | (2010.01) |
| *H01M 10/0525* | (2010.01) |
| *H01M 10/058* | (2010.01) |
| *H01M 50/411* | (2021.01) |
| *H01M 50/431* | (2021.01) |
| *H01M 50/446* | (2021.01) |
| *H01M 4/02* | (2006.01) |

(56) References Cited

U.S. PATENT DOCUMENTS

| | | | |
|---|---|---|---|
| 4,929,388 A | 5/1990 | Wessling | |
| 4,985,317 A | 1/1991 | Adachi et al. | |
| 4,990,413 A | 2/1991 | Lee et al. | |
| 5,057,573 A | 10/1991 | Pascault et al. | |
| 5,190,695 A | 3/1993 | Sotomura | |
| 5,217,827 A | 6/1993 | Fauteux et al. | |
| 5,360,686 A | 11/1994 | Peled et al. | |
| 5,521,026 A | 5/1996 | Brochu et al. | |
| 5,529,707 A | 6/1996 | Kejha | |
| H1576 H | 8/1996 | Walker, Jr. et al. | |
| 5,563,103 A | 10/1996 | Komatsu | |
| 5,576,115 A | 11/1996 | Capuano et al. | |
| 5,599,355 A | 2/1997 | Nagasubramanian et al. | |
| 5,625,474 A | 4/1997 | Aomori et al. | |
| 5,631,103 A | 5/1997 | Eschbach et al. | |
| 5,695,873 A | 12/1997 | Kumar et al. | |
| 5,965,299 A | 10/1999 | Khan et al. | |
| 6,066,417 A | 5/2000 | Cho et al. | |
| 6,096,234 A | 8/2000 | Nakanishi et al. | |
| 6,190,806 B1 | 2/2001 | Kumar et al. | |
| 6,200,707 B1 | 3/2001 | Takada et al. | |
| 6,368,746 B1 | 4/2002 | Takada et al. | |
| 6,395,429 B1 | 5/2002 | Kang et al. | |
| 6,475,677 B1 | 11/2002 | Inda et al. | |
| 6,524,749 B1 | 2/2003 | Kaneda et al. | |
| 6,645,675 B1 | 11/2003 | Munshi | |
| 6,664,006 B1 | 12/2003 | Munshi | |
| 6,939,383 B2 | 9/2005 | Eastin et al. | |
| 7,799,467 B2 | 9/2010 | DeLongchamp et al. | |
| 7,824,795 B2 | 11/2010 | Yoshida et al. | |
| 7,993,782 B2 | 8/2011 | Takada et al. | |
| 8,182,943 B2 | 5/2012 | Visco et al. | |
| 8,895,194 B2 | 11/2014 | Shigeo et al. | |
| 8,951,678 B2 | 2/2015 | Jeong et al. | |
| 8,968,928 B2 | 3/2015 | Wang et al. | |
| 9,093,722 B2 | 7/2015 | Zhang et al. | |
| 9,153,840 B2 | 10/2015 | Saimen et al. | |
| 9,231,253 B2 | 1/2016 | Lee et al. | |
| 9,786,890 B2 | 10/2017 | Cho et al. | |
| 9,812,734 B2 | 11/2017 | Miyashita et al. | |
| 9,926,411 B1 | 3/2018 | Burdynska et al. | |
| 9,966,631 B1 * | 5/2018 | Li | H01M 10/0566 |
| 9,972,838 B2 | 5/2018 | Teran et al. | |
| 9,972,863 B2 | 5/2018 | Teran et al. | |
| 10,079,404 B1 | 9/2018 | Burdynska et al. | |
| 10,174,173 B2 | 1/2019 | Burdynska et al. | |
| 10,355,319 B1 | 7/2019 | Lim et al. | |
| 10,457,781 B2 | 10/2019 | Burdynska et al. | |
| 10,797,314 B2 | 10/2020 | Teran et al. | |
| 11,355,750 B2 | 6/2022 | Teran et al. | |
| 11,394,054 B2 | 7/2022 | Villaluenga et al. | |
| 11,394,064 B2 | 7/2022 | Honjo | |
| 11,572,459 B2 | 2/2023 | Burdynska et al. | |
| 11,581,570 B2 | 2/2023 | Burdynska et al. | |
| 11,667,772 B2 | 6/2023 | Burdynska et al. | |
| 12,018,131 B2 | 6/2024 | Burdynska et al. | |
| 12,166,239 B2 | 12/2024 | Villaluenga et al. | |
| 12,355,075 B2 | 7/2025 | Teran et al. | |
| 2002/0185627 A1 | 12/2002 | Chen-Yang et al. | |
| 2002/0195591 A1 | 12/2002 | Ravet et al. | |
| 2006/0228608 A1 | 10/2006 | Chung et al. | |
| 2007/0037060 A1 | 2/2007 | Lee et al. | |
| 2008/0138697 A1 | 6/2008 | Asada et al. | |
| 2008/0166636 A1 | 7/2008 | Niitani et al. | |
| 2008/0248396 A1 | 10/2008 | Jung et al. | |
| 2008/0268346 A1 | 10/2008 | Inda | |
| 2009/0062434 A1 | 3/2009 | Chen et al. | |
| 2009/0081553 A1 | 3/2009 | Kondo et al. | |
| 2010/0055301 A1 | 3/2010 | Naoi et al. | |
| 2010/0151335 A1 | 6/2010 | Senga et al. | |
| 2011/0049745 A1 | 3/2011 | Katayama et al. | |
| 2011/0287305 A1 | 11/2011 | Scordilis-Kelley et al. | |
| 2012/0039824 A1 | 2/2012 | Archer et al. | |
| 2012/0177990 A1 | 7/2012 | Mitsuhashi et al. | |
| 2013/0040206 A1 | 2/2013 | Yoshida et al. | |
| 2013/0273419 A1 | 10/2013 | Pistorino et al. | |
| 2013/0273421 A1 | 10/2013 | Matsumura et al. | |
| 2013/0289197 A1 | 10/2013 | Pavon Sierra et al. | |
| 2013/0309549 A1 | 11/2013 | Luski et al. | |
| 2014/0093785 A1 | 4/2014 | Sugiura et al. | |
| 2014/0162138 A1 | 6/2014 | Fujiki et al. | |
| 2014/0162139 A1 | 6/2014 | Hoshiba et al. | |
| 2014/0162140 A1 | 6/2014 | Hoshiba et al. | |
| 2014/0170504 A1 | 6/2014 | Baek et al. | |
| 2014/0231706 A1 | 8/2014 | Cha et al. | |
| 2014/0234726 A1 | 8/2014 | Christensen et al. | |
| 2014/0255792 A1 | 9/2014 | Cao et al. | |
| 2015/0030933 A1 | 1/2015 | Goetzen et al. | |
| 2015/0102257 A1 | 4/2015 | Mullins et al. | |
| 2015/0147660 A1 | 5/2015 | Fujiki et al. | |
| 2015/0155546 A1 | 6/2015 | Yushin et al. | |
| 2015/0188187 A1 | 7/2015 | Strand et al. | |
| 2015/0255767 A1 | 9/2015 | Aetukuri et al. | |
| 2015/0288028 A1 | 10/2015 | DeSimone et al. | |
| 2015/0349377 A1 | 12/2015 | Sugiura et al. | |
| 2015/0349380 A1 | 12/2015 | Manthiram et al. | |
| 2015/0380739 A1 | 12/2015 | Watanabe et al. | |
| 2016/0013465 A1 | 1/2016 | Akiike | |
| 2016/0033918 A1 | 2/2016 | Taniguchi | |
| 2016/0049690 A1 | 2/2016 | Basak et al. | |
| 2016/0087306 A1 * | 3/2016 | Lee | H01M 10/0525 |
| | | | 429/317 |
| 2016/0099470 A1 | 4/2016 | Kwon et al. | |
| 2016/0226097 A1 | 8/2016 | Wegner et al. | |
| 2016/0248120 A1 | 8/2016 | Yamada et al. | |
| 2016/0293946 A1 | 10/2016 | Ritter et al. | |
| 2017/0005367 A1 | 1/2017 | Van Berkel et al. | |
| 2017/0062830 A1 | 3/2017 | Bao et al. | |
| 2017/0062873 A1 | 3/2017 | Iyer et al. | |
| 2017/0125842 A1 * | 5/2017 | Meguro | H01M 4/62 |
| 2017/0133712 A1 | 5/2017 | Mimura et al. | |
| 2017/0133717 A1 | 5/2017 | Makino et al. | |
| 2017/0162862 A1 | 6/2017 | Thielen et al. | |
| 2017/0179472 A1 | 6/2017 | Allie et al. | |
| 2017/0263908 A1 | 9/2017 | Laicer et al. | |
| 2017/0330699 A1 | 11/2017 | Buffry et al. | |
| 2017/0352916 A1 | 12/2017 | Miyashita et al. | |
| 2018/0034048 A1 | 2/2018 | Teran et al. | |
| 2018/0034061 A1 | 2/2018 | Teran et al. | |
| 2018/0034096 A1 | 2/2018 | Teran et al. | |
| 2018/0083303 A1 | 3/2018 | Platt et al. | |
| 2018/0254513 A1 | 9/2018 | Burdynska et al. | |
| 2018/0254518 A1 | 9/2018 | Burdynska et al. | |
| 2018/0261877 A1 | 9/2018 | Strand et al. | |
| 2018/0282486 A1 | 10/2018 | Burdynska et al. | |
| 2018/0351148 A1 | 12/2018 | Schneider et al. | |
| 2019/0081353 A1 | 3/2019 | Iwata et al. | |
| 2019/0135988 A1 | 5/2019 | Burdynska et al. | |
| 2019/0148765 A1 | 5/2019 | Otaki et al. | |
| 2019/0148769 A1 | 5/2019 | Aihara et al. | |
| 2019/0221879 A1 | 7/2019 | Safanama et al. | |
| 2019/0288319 A1 | 9/2019 | Kim | |
| 2019/0296393 A1 * | 9/2019 | Watanabe | H01M 10/0585 |
| 2019/0312304 A1 | 10/2019 | Uesugi et al. | |
| 2019/0334150 A1 | 10/2019 | Koh et al. | |
| 2019/0334174 A1 | 10/2019 | Hasegawa et al. | |
| 2019/0372160 A1 | 12/2019 | Makino et al. | |
| 2020/0044283 A1 | 2/2020 | Okamoto et al. | |

(56) References Cited

U.S. PATENT DOCUMENTS

| | | | |
|---|---|---|---|
| 2020/0087155 A1 | 3/2020 | Rupert | |
| 2020/0099089 A1 | 3/2020 | Mimura et al. | |
| 2020/0099104 A1 | 3/2020 | Watanabe et al. | |
| 2020/0115505 A1 | 4/2020 | Burdynska et al. | |
| 2020/0152960 A1* | 5/2020 | Grunwald | H01M 10/0525 |
| 2020/0168959 A1 | 5/2020 | Hettrich | |
| 2020/0203696 A1 | 6/2020 | Minamida | |
| 2020/0220202 A1 | 7/2020 | Burdynska et al. | |
| 2020/0220210 A1 | 7/2020 | Makino | |
| 2020/0287204 A1* | 9/2020 | Kawaura | H01M 4/386 |
| 2020/0303765 A1 | 9/2020 | Takami et al. | |
| 2020/0303772 A1 | 9/2020 | Makino et al. | |
| 2020/0365944 A1 | 11/2020 | Yang et al. | |
| 2020/0403267 A1 | 12/2020 | Li et al. | |
| 2021/0005889 A1 | 1/2021 | Teran et al. | |
| 2021/0047195 A1 | 2/2021 | Rupert | |
| 2021/0050620 A1 | 2/2021 | Rupert | |
| 2021/0057726 A1 | 2/2021 | Hoft et al. | |
| 2021/0135278 A1 | 5/2021 | Kim et al. | |
| 2021/0167417 A1 | 6/2021 | Chao et al. | |
| 2021/0184252 A1* | 6/2021 | Yawata | H01M 4/622 |
| 2021/0189105 A1 | 6/2021 | Burdynska et al. | |
| 2021/0194039 A1 | 6/2021 | Burdynska et al. | |
| 2021/0194047 A1 | 6/2021 | Villaluenga et al. | |
| 2021/0313616 A1 | 10/2021 | Villaluenga et al. | |
| 2021/0389645 A1 | 12/2021 | Kim | |
| 2022/0021023 A1 | 1/2022 | Burdynska et al. | |
| 2022/0021079 A1 | 1/2022 | Villaluenga et al. | |
| 2022/0069338 A1 | 3/2022 | Lee et al. | |
| 2022/0077493 A1 | 3/2022 | Oshima et al. | |
| 2022/0115645 A1 | 4/2022 | Adireddy et al. | |
| 2022/0131184 A1* | 4/2022 | Yu | H01M 4/62 |
| 2022/0181684 A1* | 6/2022 | Xu | H01M 10/058 |
| 2022/0255150 A1 | 8/2022 | Kim et al. | |
| 2022/0367861 A1 | 11/2022 | Wujcik et al. | |
| 2022/0407057 A1 | 12/2022 | Teran et al. | |
| 2023/0096123 A1 | 3/2023 | Johnson et al. | |
| 2023/0374277 A1 | 11/2023 | Burdynska et al. | |
| 2024/0283041 A1 | 8/2024 | Wujcik et al. | |
| 2024/0301145 A1 | 9/2024 | Burdynska et al. | |
| 2025/0105346 A1 | 3/2025 | Burdynska et al. | |
| 2025/0192374 A1 | 6/2025 | Villaluenga et al. | |

FOREIGN PATENT DOCUMENTS

| | | | |
|---|---|---|---|
| CN | 107403904 A | | 11/2017 |
| CN | 107710455 A | | 2/2018 |
| CN | 109786845 A | | 5/2019 |
| CN | 109962288 A | | 7/2019 |
| CN | 110663085 A | | 1/2020 |
| CN | 110914940 A | | 3/2020 |
| CN | 111384456 | * | 7/2020 |
| CN | 111384456 A | * | 7/2020 |
| DE | 102015224345 A1 | | 6/2017 |
| DE | 102019211857 B3 | * | 11/2020 |
| EP | 2262038 A1 | | 12/2010 |
| EP | 3407412 B1 | | 4/2021 |
| JP | H0689705 A | | 3/1994 |
| JP | 2001291529 A | | 10/2001 |
| JP | 2003508886 A | | 3/2003 |
| JP | 2010056070 A | | 3/2010 |
| JP | 2010106252 A | | 5/2010 |
| JP | 2010186682 A | | 8/2010 |
| JP | 2010272210 A | | 12/2010 |
| JP | 2013033659 A | | 2/2013 |
| JP | 2014035987 A | | 2/2014 |
| JP | 2015191866 A | | 11/2015 |
| JP | 2016033917 A | | 3/2016 |
| JP | 2018521173 A | | 8/2018 |
| JP | 2019091547 A | | 6/2019 |
| JP | 2019526893 A | | 9/2019 |
| JP | 2020509132 A | | 3/2020 |
| JP | 2020068170 | * | 4/2020 |
| JP | 2020068170 A | * | 4/2020 |
| KR | 19990025432 A | | 4/1999 |
| KR | 20180021797 A | | 3/2018 |
| TW | 200400281 A | | 1/2004 |
| WO | WO-2016017525 A1 | | 2/2016 |
| WO | WO-2016129427 A1 | | 8/2016 |
| WO | WO-2017027395 A1 | | 2/2017 |
| WO | WO-2017093107 A1 | | 6/2017 |
| WO | WO-2018023079 A1 | | 2/2018 |
| WO | WO-2018151161 A1 | | 8/2018 |
| WO | WO-2019017310 A1 | | 1/2019 |
| WO | WO-2019119779 A1 | | 6/2019 |
| WO | WO-2020252427 A1 | | 12/2020 |
| WO | WO-2021183858 A1 | | 9/2021 |
| WO | WO-2022016194 A1 | | 1/2022 |

OTHER PUBLICATIONS

Baoyun, L., "Molecular Weight, Molecular Weight Distribution and Bonding Strength of Adhesive", Organic Chemicals Engineering Technology, May 1982, vol. 1, No. 2, pp. 18-25.

CN Office Action dated May 23, 2022, in Application No. CN201780054522.1 with English translation.

Doux, J. et al., "Pressure Effects on Sulfide Electrolytes for All Solid-state Batteries", Journal of Materials Chemistry A, 2020, vol. 8, pp. 5049-5055.

International Preliminary Report on Patentability dated Jun. 30, 2022, in PCT Application No. PCT/US2020/066180.

International Preliminary Report on Patentability dated Jun. 30, 2022, in PCT Application No. PCT/US2020/066189.

Manjun, H. et al., "High Polymer Physics", Fudan University Press, Oct. 1990, 182 pages.

U.S. Non-Final office Action dated Jun. 14, 2022 in U.S. Appl. No. 17/129,290.

U.S. Appl. No. 17/661,898, inventors Teran et al., filed May 3, 2022.

U.S. Appl. No. 17/735,961, inventors Wujcik et al., filed May 3, 2022.

U.S. Appl. No. 17/808,295, inventors Villaluenga et al., filed Jun. 22, 2022.

Wang, M.J. et al., "Characterizing the Li-Solid-Electrolyte Interface Dynamics as a Function of Stack Pressure and Current Density", Joule, Sep. 18, 2019, vol. 3, pp. 2165-2178.

Cao, Can et al., "Recent advances in inorganic solid electrolytes for lithium batteries," Frontiers in Energy Research, Jun. 27, 2014, vol. 2, Article 25, pp. 1-10.

Chilaka et al., "Solid-state poly(ethylene glycol)polyurethane/polymethylmethacrylate/rutile Ti02 nanofiber composite electrolyte-correlation between morphology and conducting properties", Electrochimica Acta, vol. 62, Feb. 1, 2012 (Feb. 1, 2012), pp. 362-371, XP055127951, ISSN: 0013-4686, DOI: 10.1016/j.electacta.2011.12.052.

Chinese Office Action dated Feb. 7, 2021 issued in Application No. 201880026321.5.

Chinese Office Action dated Sep. 3, 2021 issued in Application No. 201780054522.1.

CN Office Action dated Oct. 18, 2021, in CN Application No. CN201880026321.5 with English translation.

Dey, A., et al., "Micro-Structural Effect on Hydroxy Terminated Poly Butadiene (HTPB) Prepolymer and HTPB Based Composite Propellant," Molecular Nanotechnology & Nanomedicine, vol. 1, Issue 1, 2017, pp. 1-7.

English language translation for CN Application No. CN107403904A (Jun Haizu), 2017.

Extended European Search Report and Opinion dated Nov. 12, 2020 issued in Application No. 18760743.7.

Extended European Search Report dated Feb. 25, 2020 issued in Application No. 17835391.8.

Final Office Action dated Jul. 12, 2021 in U.S. Appl. No. 17/129,290.

Final Office Action dated Jul. 19, 2021 in U.S. Appl. No. 16/241,784.

Hu, Qichao, "Electrode-Electrolyte Interfaces in Solid Polymer Lithium Batteries," Submitted to Harvard School of Engineering and Applied Sciences, May 1, 2012, 131 pages.

Inada, et al., "Fabrications and properties of composite solid-state electrolytes," Solid State Ionics, vol. 158, 2003, pp. 275-280.

(56) References Cited

OTHER PUBLICATIONS

Inada, et al., "Silicone as a binder in composite electrolytes," Journal of Power Sources, vol. 119-121, 2003, pp. 948-950.

International Preliminary Report on Patentability dated Sep. 12, 2019 issued in PCT/US2018/020780.

International Search Report and Written Opinion dated Dec. 12, 2017 issued in Application No. PCT/US17/44530.

International Search Report and Written Opinion dated Jun. 29, 2021 issued in PCT/US2021/025663.

International Search Report and Written Opinion dated Mar. 17, 2021 issued in Application No. PCT/US2020/066180.

International Search Report and Written Opinion dated Mar. 17, 2021 issued in Application No. PCT/US2020/066189.

International Search Report and Written Opinion dated Mar. 24, 2020 issued in PCT/US2020/012409.

International Search Report and Written Opinion dated May 15, 2018 issued in Application No. PCT/US18/20780.

Invitation to Pay additional Fees dated Oct. 2, 2017, issued in Application No. PCT/US17/44530.

JP Office Action dated Feb. 1, 2022, in Application No. JP2019-547367.

Knauth, P. et al., "Inorganic Solid Li Ion Conductors: An Overview", Solid State Ionics, 2009, vol. 180, pp. 911-916.

Kong, S. et al., "Li6PO5Br and Li6PO5Cl: The first Lithium-Oxide-Argyrodites," Wiley-VCh Verlag GmbH & Co. KGaA, Weinheim, DOI: 10.1002/zaac.201000121, 2010, 1920-1924.

MacFarlane, D. R., et al., "Lithium-ion conducting ceramic/polyether composites," Electrochimica Acta, vol. 43, Nos. 10-11, pp. 1333-1337, 1998.

Manjari, R., et al., "Structure-Property Relationship of HTPB-Based Propellants. II Formulation Tailoring for Better Mechanical Properties," Journal of Applied Polymer Science, vol. 48, 1993, 279-289.

Minafra, N. et al., "Effect of Si Substitution on the Structural and Transport Properties of Superionic Li—argyrodites" Journal of Materials Chemistry A, 2018, vol. 6, pp. 645-651.

Minami, T. et al., "Recent Progress in Superionic Conducting Glasses", Journal of Non Crystalline Solids, 1987, vol. 95 &96, pp. 107-118.

Nairn, K., et al., "Polymer-Ceramic Ion-Conducting Composites," Solid State Ionics, 86-88, 1996, pp. 589-593.

Nasef et al. "Preparation of polymer electrolyte membranes for lithium batteries by radiationinduced graft copolymerization" Solid State Ionics. 2004, vol. 171, p. 243-249; p. 243, abstract, p. 244, left col., para 1.

Nilges and Pfitzner, Z. Kristallogr., "A Structural Differentiation of quaternary copper argyrodites: Structure—property relations of high temperature ion conductors," 2005, vol. 220, pp. 281-294 https://epub.uni-regensburg.de/11740/1/87_A%20structural% 20differentiation%20of%20quaternary%20copper%20argyrodites% 20Structure%20-%20property%20relations%20of%20high% 20temperature%20ion%20conductors.pdf).

Notice of Allowance (corrected) received on Dec. 5, 2018, in U.S. Appl. No. 15/936,221.

Notice of Allowance mailed Apr. 13, 2020 issued in U.S. Appl. No. 15/607,323.

Notice of Allowance received on Aug. 23, 2017, in U.S. Appl. No. 15/607,328.

Notice of Allowance received on Feb. 16, 2018, in U.S. Appl. No. 15/607,328.

Notice of Allowance received on Jan. 22, 2018, in Application No. 15/662,116.

Notice of Allowance received on Jan. 4, 2018, in U.S. Appl. No. 15/607,336.

Notice of Allowance received on Jul. 19, 2018, in U.S. Appl. No. 15/662,102.

Notice of Allowance received on Nov. 9, 2018, in U.S. Appl. No. 15/936,221.

Notice of Allowance received on Sep. 5, 2019, in U.S. Appl. No. 16/240,257.

Office Action dated Apr. 28, 2021 in U.S. Appl. No. 17/129,277.

Office Action dated Aug. 13, 2021 in U.S. Appl. No. 16/814,756.

Office Action dated Feb. 16, 2021 in U.S. Appl. No. 17/129,290.

Office Action dated Jan. 13, 2021 in U.S. Appl. No. 16/814,756.

Office Action dated Oct. 15, 2020 in U.S. Appl. No. 16/241,784.

Office Action dated Sep. 16, 2021 issued in U.S. Appl. No. 16/946,974.

Office Action received on Aug. 25, 2017, in U.S. Appl. No. 15/607,336.

Office Action received on Aug. 27, 2018, in U.S. Appl. No. 15/936,221.

Office Action received on May 29, 2019, in U.S. Appl. No. 16/240,257.

Office Action received on Nov. 28, 2017, in U.S. Appl. No. 15/662,102.

Office Action received on Sep. 17, 2019, in U.S. Appl. No. 15/607,323.

Office Action received on Sep. 18, 2017, in U.S. Appl. No. 15/662,116.

Preliminary Amendment dated Sep. 24, 2020 for U.S. Appl. No. 16/946,974.

Ribes, M. et al., "Sulfide Glasses: Glass Forming Region, Structure and Ionic Conduction of Glasses in Na2S-XS2 (X—Si ; Ge), Na2S-P2S5 and Li2S—GeS2 Systems", Journal of Non-Crystalline Solids, vol. 38 & 39, 1980, pp. 271-276.

Santoro, M., et al., "High-Pressure Synthesis of a Polyethylene/ zeolite Nano-Composite Material," Nature Communications, Published Mar. 5, 2013, 7 pages.

Sasuga, et al., "Liquid-Liquid Transition and Radiation-Induced Polymerization of Vinyl Acetate at High Pressure," Macromolecules, 1983, vol. 16, No. 4, pp. 545-548.

Shah et al., "Polymer Nanocomposites as Solid Electrolytes: Evaluating Ion-Polymer and PolymerNanoparticle Interactions in PEG-PU/PAN Semi-IPNs and Titania Systems", Journal of Physical Chemistry C, vol. 114, No. 33, Aug. 26, 2010 (Aug. 26, 2010), pp. 14281-14289, XP055127969, ISSN: 1932-7447, DOI: 10.1021/ jp105450q.

Skaarup, et al., "Mixed phase solid electrolytes with nonconducting polymer binder," Solid State Ionics, vol. 40/41, 1990, pp. 1021-1024.

Snyder. L.R., "Classification of the Solvent Properties of Common Liquids", Journal of Chromatography, 92, 1978, pp. 223-234.

Tatsumisago, M. et al., "Preparation of Li3BO3—Li2SO4 Glass-ceramic Electrolytes for All-oxide Lithium Batteries", Journal of Power Sources, vol. 270, 2014, pp. 603-607.

U.S. Corrected Notice of Allowance dated May 10, 2022 in U.S. Appl. No. 16/946,974.

U.S. Final Office Action dated Nov. 5, 2021 in U.S. Appl. No. 17/129,277.

U.S. Non Final office action dated Apr. 1, 2022, in U.S. Appl. No. 17/129,290.

U.S. Non Final Office Action dated Jan. 27, 2022 in U.S. Appl. No. 16/241,784.

U.S. Non-Final Office Action dated Apr. 28, 2021 in U.S. Appl. No. 17/129,277.

U.S. Non-Final Office Action dated May 12, 2022 in U.S. Appl. No. 17/129,277.

U.S. Notice of Allowance dated Feb. 1, 2022 in U.S. Appl. No. 16/946,974.

U.S. Notice of Allowance dated Mar. 15, 2022, in U.S. Appl. No. 16/814,756.

U.S. Requirement for Restriction dated Feb. 24, 2022 in U.S. Appl. No. 17/129,277.

U.S. Restriction Requirement dated Mar. 14, 2022, in U.S. Appl. No. 16/714,555.

Villaluenga, et al., "Compliant glass-polymer hybrid single ion-conducting electrolytes for lithium batteries," PNAS Early Edition, 2015, pp. 1-6.

Xu et al., A thermally healable polyhedral oligomeric silsesquioxane (POSS) nanocomposite based on Diels-Alder chemistry, Chem. Commun. 2013,49, 6755-6757.

Zhang, Z. et al., "Design and Synthesis of Room Temperature Stable Li—argyrodite Superionic Conductors via Cation Doping", Journal of Materials Chemistry A, 2019, vol. 7, pp. 2717-2722.

(56)          References Cited

OTHER PUBLICATIONS

Zhao, Y. et al., "Superionic Conductivity in Lithium-rich Anti-perovskites", Journal of the American Chemical Society, 2012, vol. 134, pp. 15042-15047.

Zhou et al., "New Family of Argyrodite Thioantimonate Lithium Superionic Conductors," J. Am. Chem. Soc., 2019, vol. 141, 28 pages https://www.osti.gov/biblio/1606830-new-family-argyrodite-thioantimonate-lithium-superionic-conductors.

CN Office Action dated Jun. 29, 2022, in CN Application No. CN201880026321.5 with English translation.

International Preliminary Report on Patentability dated Oct. 13, 2022, in PCT Application No. PCT/US2021/025663.

International Search Report and Written Opinion dated Jan. 23, 2023, in Application No. PCT/US2022/027510.

JP Office Action dated Aug. 30, 2022 in Application No. JP20190547367 with English translation.

U.S. Non-Final office Action dated Oct. 19, 2022 in U.S. Appl. No. 16/714,555.

U.S. Notice of Allowance dated Sep. 28, 2022 in U.S. Appl. No. 16/241,784.

U.S. Notice of Allowance dated Sep. 30, 2022 in U.S. Appl. No. 17/129,277.

U.S. Corrected Notice of Allowance dated Nov. 3, 2022 in U.S. Appl. No. 16/241,784.

U.S. Non-Final office Action dated Aug. 30, 2022 in U.S. Appl. No. 17/304,645.

U.S. Non-Final Office Action dated Dec. 21, 2022 in U.S. Appl. No. 17/304,646.

U.S. Notice of Allowance dated Jan. 17, 2023 in U.S. Appl. No. 16/241,784.

U.S. Notice of Allowance dated Jan. 13, 2023 in U.S. Appl. No. 17/129,290.

U.S. Notice of Allowance dated Oct. 7, 2022 in U.S. Appl. No. 17/129,277.

US Office Action dated Mar. 8, 2021 issued in U.S. Appl. No. 16/829,962.

U.S. Supplementary Notice of Allowance dated Jan. 9, 2023 in U.S. Appl. No. 17/129,277.

Yu. C, et al., "Revealing the relation between the structure, Li—ion conductivity and solid-state battery performance of the argyrodite Li6PS5Br solid electrolyte", Journal of Materials Chemistry A, 2017, vol. 5, pp. 21178-81188.

Zhang. J, et al., "All-solid-state batteries with slurry coated LiNi0.8Co0.1Mn0.1O2 composite cathode and Li6PS5Cl electrolyte: Effect of content", Journal of Power Sources 391, 2018 pp. 73-79.

KR Office Action dated Mar. 14, 2023, in Application No. KR10-2019-7028721.

U.S. Non-Final Office Action dated Apr. 28, 2023, in U.S. Appl. No. 17/301,457.

U.S. Notice of Allowance dated Apr. 13, 2023 in U.S. Appl. No. 17/129,290.

U.S. Notice of Allowance dated Mar. 24, 2023 in U.S. Appl. No. 17/129,290.

JP Office Action dated Apr. 25, 2023 in Application No. JP2019-547367 with English translation.

U.S. Final office Action dated Aug. 1, 2023 in U.S. Appl. No. 17/304,646.

U.S. Final office Action dated Jun. 8, 2023 in U.S. Appl. No. 17/304,645.

U.S. Notice of Allowance dated Jul. 7, 2023, in U.S. Appl. No. 16/714,555.

U.S. Appl. No. 18/155,560, inventors Burdynska J, et al., filed Jan. 17, 2023.

CN Office Action dated Apr. 23, 2023, in application No. CN201880026321.5 with English translation.

International Preliminary Report on Patentability and Written Opinion dated Nov. 16, 2023 in PCT Application No. PCT/US2022/027510.

U.S. Final office Action dated Nov. 7, 2023 in U.S. Appl. No. 17/301,457.

U.S. Non-Final Office Action dated Jan. 19, 2024 in U.S. Appl. No. 17/304,645.

U.S. Notice of Allowance dated Feb. 12, 2024 in U.S. Appl. No. 16/714,555.

U.S. Restriction requirement dated Sep. 21, 2023, in U.S. Appl. No. 18/155,560.

JP Office Action dated Feb. 1, 2022 in JP Application No. 2019-547367, with English Translation.

KR Office Action dated Mar. 14, 2023 in KR Application No. 10-2019-7028721, with English Translation.

Lee K., et.al., "Thiol-Ene Click Reaction for Fine Polarity Tuning of Polymeric Binders in Solution-Processed All-Solid-State Batteries," ACS Energy Letters, 2019, vol. 4, pp. 94-101.

U.S. Non-Final Office Action dated Feb. 28, 2024 in U.S. Appl. No. 17/304,646.

U.S. Non-Final Office Action dated Mar. 29, 2024 in U.S. Appl. No. 18/155,560.

U.S. Notice of Allowance dated Feb. 21, 2024 in U.S. Appl. No. 16/714,555.

U.S. Notice of Allowance dated May 22, 2024 in U.S. Appl. No. 16/714,555.

U.S. Appl. No. 18/655,112, inventor Wujcik K, filed May 13, 2024.

U.S. Appl. No. 18/667,185, inventor Burdynska J, filed May 17, 2024.

U.S. Restriction Requirement dated May 9, 2024 in U.S. Appl. No. 17/661,898.

EP Extended European Search report dated Jul. 16, 2024 in EP Application No. 20901183.2.

U.S. Non-Final Office Action dated Aug. 1, 2024 in U.S. Appl. No. 17/661,898.

U.S. Non-Final Office Action dated Aug. 26, 2024 in U.S. Appl. No. 18/655,112.

U.S. Non-Final Office Action dated Jul. 11, 2024 in U.S. Appl. No. 17/301,457.

U.S. Notice of Allowance dated Jul. 31, 2024 in U.S. Appl. No. 17/304,645.

U.S. Appl. No. 18/818,445, inventors Burdynska J, et al., filed Aug. 28, 2024.

U.S. Restriction Requirement dated Sep. 9, 2024 in U.S. Appl. No. 17/735,961.

CN Office Action and Search Report dated May 21, 2025 in CN Application No. 202180038240.9, with English Translation.

EP Extended European Search Report dated May 22, 2025 in EP Application No. 21780763.5.

EP Extended European Search report dated Oct. 10, 2025 in EP Application No. 22799446.4.

JP Office Action dated Jul. 22, 2025 in JP Application No. 2022-536988, with English Translation.

JP Office Action dated May 7, 2025 in JP Application No. 2022-560397, with English Translation.

KR Office Action dated Aug. 7, 2025 in KR Application No. 10-2022-7025015, with English Translation.

KR Office Action dated Sep. 24, 2025 in KR Application No. 10-2022-7038846, with English Translation.

Patel A.M., et al., "Synthesis, Characterization and Material Application of Poly(Urea-Imide)s, Part 1," International Journal of Polymeric Materials, 2010, vol. 59, pp. 98-108.

U.S. Advisory Action dated May 9, 2025 in U.S. Appl. No. 18/155,560.

US Non-Final Office Action dated Aug. 13, 2025 in U.S. Appl. No. 18/155,560.

U.S. Non-Final Office Action dated Aug. 25, 2025 in U.S. Appl. No. 18/951,559.

U.S. Non-Final Office Action dated Jun. 26, 2025 in U.S. Appl. No. 18/667,185.

US Non-Final Office Action dated May 2, 2025 in U.S. Appl. No. 17/735,961.

U.S. Non-Final Office Action dated Nov. 18, 2025 in U.S. Appl. No. 17/301,457.

U.S. Appl. No. 19/238,135, inventors Teran A et al., filed Jun. 13, 2025.

U.S. Appl. No. 19/376,759, inventors Wujcik K et al., filed Oct. 31, 2025.

(56) References Cited

OTHER PUBLICATIONS

U.S. Restriction Requirement dated Apr. 10, 2025 in U.S. Appl. No. 18/667,185.

CN Office Action dated Dec. 25, 2025 in CN Application No. 202080095627.3, with English Translation.

CN Office Action dated Feb. 27, 2025 in CN Application No. 202080095627.3, with English Translation.

JP Office Action dated Nov. 12, 2024 in JP Application No. 2022-536988 with English translation.

U.S. Final Office Action dated Feb. 5, 2025 in U.S. Appl. No. 18/155,560.

U.S. Final Office Action dated Mar. 26, 2025 in U.S. Appl. No. 17/301,457.

U.S. Notice of Allowance dated Mar. 4, 2025 in U.S. Appl. No. 17/661,898.

U.S. Appl. No. 18/951,559, inventors Villaluenga I, et al., filed Nov. 18, 2024.

U.S. Restriction requirement dated Oct. 16, 2024 in U.S. Appl. No. 18/155,560.

Zhou J., et al., "Impacts of Anion-exchange-membranes With Various Ionic Exchange Capacities on the Performance of $H_2/O_2$ Fuel Cells," Journal of Power Sources, 2012, vol. 219, pp. 272-279.

JP Office Action dated Mar. 17, 2026 in JP Application No. 2023-566729, with English Translation.

U.S. Final Office Action dated Mar. 4, 2026 in U.S. Appl. No. 18/155,560.

U.S. Non-Final Office Action dated Feb. 24, 2026 in U.S. Appl. No. 18/667,185.

U.S. Notice of Allowance dated Mar. 24, 2026 in U.S. Appl. No. 18/951,559.

* cited by examiner

Anode
1001

Separator
Application
1003

Cathode
Application
1005

Single
stack
1007

Cathode current collector

Cathode film

Separator (CES)

Anode film

Anode current collector

Provide preformed cell elements
1101

Stack preformed cell elements and
current collectors to form multi-stack
1103

Heat press multi-stack
1105

Fig. 12

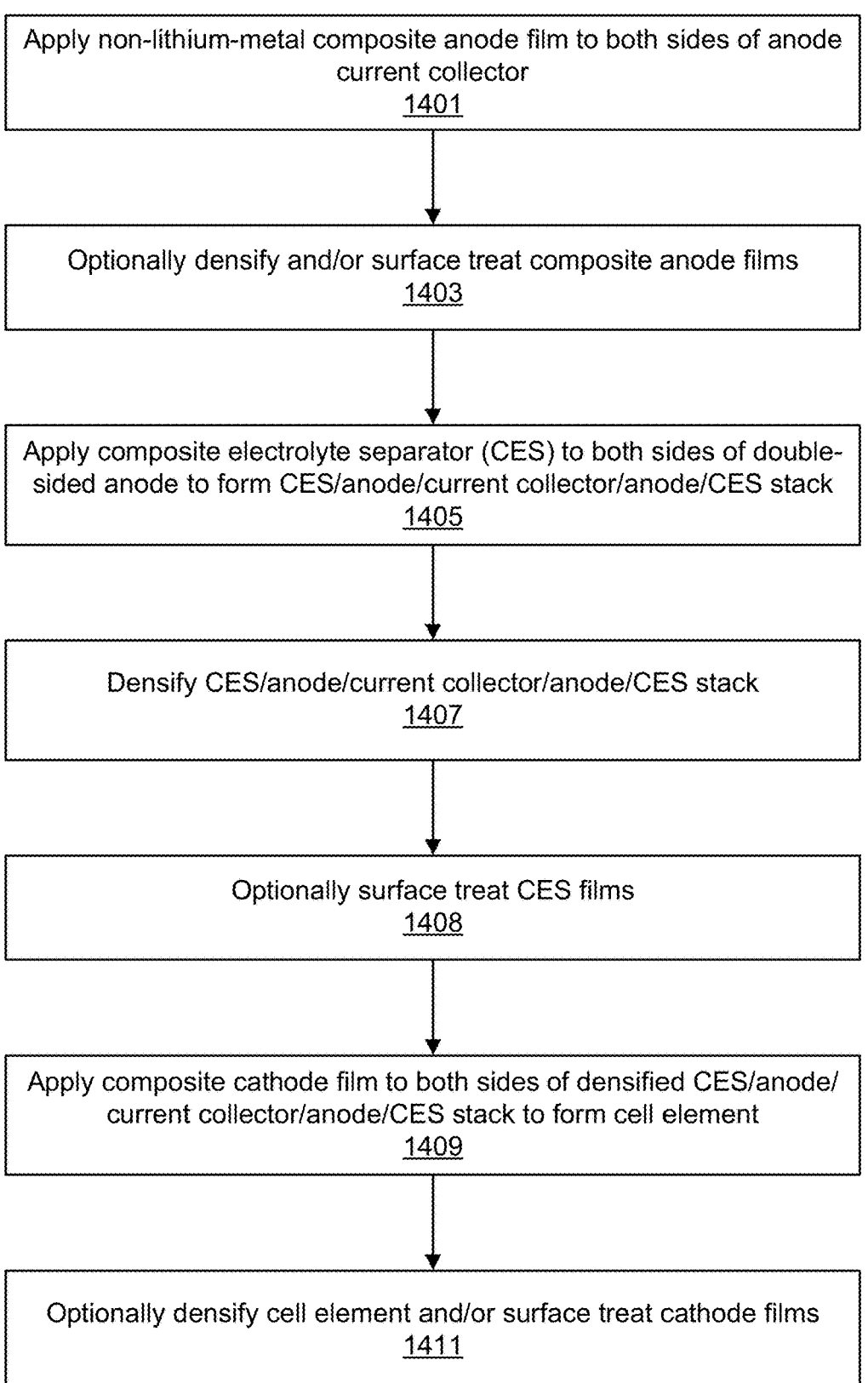

Apply non-lithium-metal composite anode film to both sides of anode current collector
1401

Optionally densify and/or surface treat composite anode films
1403

Apply composite electrolyte separator (CES) to both sides of double-sided anode to form CES/anode/current collector/anode/CES stack
1405

Densify CES/anode/current collector/anode/CES stack
1407

Optionally surface treat CES films
1408

Apply composite cathode film to both sides of densified CES/anode/current collector/anode/CES stack to form cell element
1409

Optionally densify cell element and/or surface treat cathode films
1411

Fig. 14

SOLID-STATE LITHIUM-ION BATTERY CELL CONDITIONING PROCESS AND COMPOSITION

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Solid-state primary and secondary batteries present various advantages over batteries that use liquid electrolytes. For example, in lithium-ion secondary batteries, inorganic solid-state electrolytes may be less flammable than conventional liquid organic electrolytes. Solid-state electrolytes may also present advantages of high energy densities, good cycling stabilities, and electrochemical stabilities over a range of conditions. However, there are various challenges in large scale commercialization of batteries with solid-state electrolyte separators. One challenge is maintaining contact between the separator and the electrodes. For example, while inorganic materials such as inorganic sulfide glasses and ceramics have high ionic conductivities (over $10^{-4}$ S/cm) at room temperature, they do not serve as efficient electrolytes due to poor adhesion to the electrode during battery cycling. Another challenge is that glass and ceramic solid-state conductors are too brittle to be processed into dense, thin films on a large scale. This can result in high bulk electrolyte resistance due to the films being too thick, as well as dendrite formation, due to the presence of voids that allow dendrite penetration. The mechanical properties of even relatively ductile sulfide glasses are not adequate to process the glasses into dense, thin films.

SUMMARY

One aspect of the disclosure relates to a method including: providing a solid-state lithium-ion battery cell; performing a high-pressure conditioning process including an first charge/discharge cycle at an applied pressure on the solid-state lithium-ion battery cell of greater than an operating pressure; and removing or reducing the applied pressure to the operating pressure for operation.

In some embodiments, the cell is provided uncycled. In some embodiments, the first charge/discharge cycle is performed prior to the cell being cycled after cell assembly. In other embodiments, one or more initial cycles may be performed before the first cycle.

In some embodiments, the ratio of the applied pressure to the operation pressure is at least 1.5:1.

In some embodiments, the applied pressure during the high-pressure conditioning process is at least 1 MPa.

In some embodiments, the high-pressure conditioning process includes one or more additional charge/discharge cycles at an applied pressure of greater than the operating pressure. In some such embodiments, the high-pressure conditioning process is performed until the cycle-to-cycle percent thickness change of the cell (measured in the fully discharged state) is less than a threshold amount. In some embodiments, wherein the threshold amount is no more than 10% or 5%. In some embodiments, the threshold amount is no more than 2.5%.

In some embodiments, the high-pressure conditioning process is performed until the cycle-to-cycle percent resistance change of the cell is less than a threshold amount.

In some embodiments, the cell thickness measured in a fully discharged state is less than 5% greater than the thickness of the cell in a fully discharged state prior to the conditioning process being performed.

In some embodiments, the applied pressure is constant throughout the high-pressure conditioning process. In some embodiments, the applied pressure is varied during the high-pressure conditioning process.

In some embodiments, a charge process of a cycle is performed until the cell has reached a predetermined level of a one of a) voltage; b) a current, c) a desired state of charge, d) or an amount of capacity. In some such embodiments, wherein the predetermined level varies over at least two cycles.

In some embodiments, a charge process of a subsequent cycle is performed at a rate of current higher than the first cycle.

In some embodiments, the solid-state lithium-ion battery cell includes an anode active material including silicon.

In some such embodiments, the anode active material includes at least one of elemental silicon, a silicon oxide, a silicon alloy, and a silicon-carbon composite.

In some embodiments, the solid-state lithium-ion battery includes a separator including a polymer and inorganic solid electrolyte particles.

In some embodiments, the high pressure conditioning process is performed until the cycle-to-cycle percent change of the pressure measured within the cell pressure fixture is less than a threshold amount.

In some embodiments, the pressure measured within a cell pressure fixture when the cell is fully discharged is less than the pressure applied to the cell at the beginning of the conditioning process.

Another aspect of the disclosure relates to a solid-state lithium-ion battery cell, including: an anode including a polymer binder, active material particles including silicon, and solid electrolyte particles; a cathode including a polymer binder, active material particles, and solid electrolyte particles; and a separator including a polymer binder and solid electrolyte particles, wherein the solid-state lithium-ion battery cell undergoes no more than 2% thickness increase from a) end of discharge (EOD) of one cycle to b) end of discharge of the next cycle.

Another aspect of the disclosure relates to a solid-state lithium-ion battery cell, including: an anode including a polymer binder, active material particles including silicon, and solid electrolyte particles; a cathode including a polymer binder, active material particles, and solid electrolyte particles; and a separator including a polymer binder and solid electrolyte particles, wherein the solid-state lithium-ion battery cell undergoes no more than 5% thickness increase over three or more cycles. In some embodiments, it undergoes no more than 5% thickness increase over 5 or more or 10 or more cycles.

Another aspect of the disclosure relates to a solid-state lithium-ion battery cell, including: an anode including a polymer binder, active material particles including silicon, and solid electrolyte particles; a cathode including a polymer binder, active material particles, and solid electrolyte particles; and a separator including a polymer binder and solid electrolyte particles, wherein the solid-state lithium-ion battery cell is identifiable as a self-contained cell by applying a test including cycling the solid-state lithium-ion battery cell at a first pressure, cycling an identical cell at a second pressure higher than the first pressure, and comparing the percent capacity loss per cycle of the cells. In some embodiments, the cell is identifiable as a self-contained cell if the percent capacity loss per cycle (PCLPC) is less than 5 times greater than that of the cell cycled at the second pressure. In some embodiments, it may be less than 3 times greater.

In some embodiments, the test includes: cycling the solid-state lithium-ion battery cell for twenty cycles at a rate of C/5, to full depth of discharge, at a temperature of 25° C., and an operating pressure of 1 MPa; cycling an identical solid-state lithium-ion battery cell for twenty cycles at a rate of C/5, to full depth of discharge, at a temperature of 25° C., and an operating pressure of 3 MPa; calculating the percent of capacity lost per cycle for the lithium-ion battery cycled under 1 MPa operating pressure (PCLPC-1); calculating the percent of capacity lost per cycle for the lithium-ion battery cycled under 1 MPa operating pressure (PCLPC-3); and identifying the solid-state lithium-ion battery cell as a self-contained cell if PCLPC-1 is less than 5 times greater than PCLPC-3.

These and other features are discussed further below with respect to the drawings.

BRIEF DESCRIPTION OF DRAWINGS

FIG. 2 shows the average discharge capacity for cells cycled at 1 MPa. FIG. 3 shows the average discharge capacity for cells that were first cycled at 3 MPa and decreased to 1 MPa.

FIGS. 10, 12, and 13 show schematic examples illustrating certain operations in methods of assembling of a solid-state battery prior to conditioning.

FIG. 14 is a process flow diagram showing certain operations in a method of forming a preformed cell element.

DESCRIPTION

Figure 1:
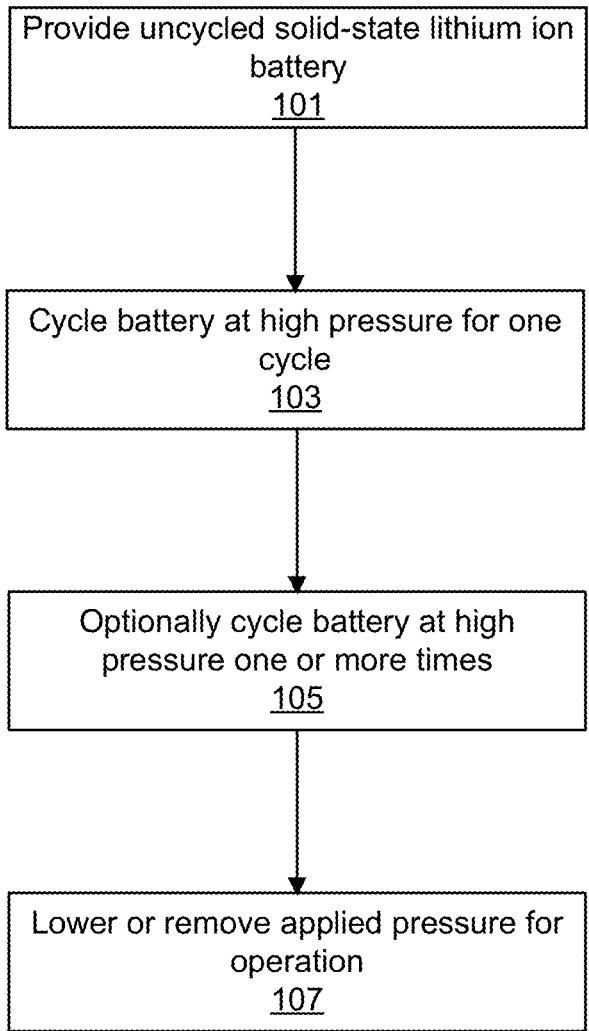
FIG. 1 is a process flow diagram showing operations in a method of conditioning a cell prior to normal operation.

Provided herein are solid-state battery cells that include solid-state electrodes and a solid-state separator. The solid-state separator includes solid electrolyte particles and a polymer. The electrodes include active material particles, solid electrolyte particles, and polymer. They may also include an electronically conductive additive, such as carbon particles that form a conductive network.

To maintain contact between the separator and electrodes, and between electrode active materials and solid electrolyte, a battery cell may be operated under high pressure. In addition to maintaining electrode/separator contact, contact between solid electrolyte particles, contact between solid electrolyte particles and active material particles, is maintained or improved.

Application of pressure is particularly beneficial for solid-state batteries that include active materials that undergo significant volume changes during charge and discharge. For example, pure silicon (an anode active material) can expand and contract by up to 300% during lithiation/delithiation. While the below description refers chiefly to silicon active material, the methods and resulting microstructures may also be applied to other active materials. The methods may be particularly useful for active materials that, like silicon, undergo large volume changes during charge and discharge. These can include silicon-containing materials (e.g., silicon oxides, silicon carbides, etc.), tin, and germanium in the anode, and elemental sulfur in the cathode.

In liquid electrolyte cells, this volume change can lead to significant swelling of the cell volume, which can result in delamination from the anode current collector and creates significant challenges for commercial implementation. Continuous volume expansion/contraction leads to continuous formation of a solid electrolyte interphase (SEI) layer that consumes the cell's lithium content and worsens contact between the active material and carbon additive in the anode. These issues lead to rapid capacity fade and increased electrode resistivity.

In a solid-state cell, expansion and contraction of the anode can cause silicon active material particles to lose contact with electrolyte particles and carbon additive. This leads to an increase in cell resistance and capacity fade. As such, application of pressure can be particularly important to maintain performance of silicon-based solid-state cells, as pressure resists the expansion of the electrode thickness and maintains contact between anode particles.

Charging a cell at a low pressure can cause significant and irreversible expansion of an anode of a solid-state lithium-ion cell. This can separate solid electrolyte particles and destroy the carbon additive network. As a result, the ionic and electrical conductivity of the anode may significantly decrease. Contact between the active material and solid electrolyte and/or carbon particles may be lost, leading to lithium plating, higher overpotentials during charge, lower output voltage on discharge, and capacity fade.

Discharging the cell at a low pressure can result in shrinking silicon active material particles. The silicon active material particles contract away from and lose contact with carbon particles and solid electrolyte particles. This can result in irreversible capacity loss, as silicon particles remain partially lithiated at the end of each discharge process. Electrolyte particles and carbon particles that were separated during the charge process remain separated without sufficient application of pressure, and the electrode remains resistive.

Operating pressures applied to solid-state batteries including silicon active material may be 2-100 MPa to avoid the above-described problems. In particular, the overall expansion of the anode thickness is suppressed during charge, contact between electrolyte particles is maintained, the electrically conductive additive network remains intact, and electrolyte and carbon particle contact with silicon active material can be maintained. During discharge, application of pressure ensures that contact between active material particles and electrolyte and carbon additive particles is maintained even as the active material particles shrink and potentially contract away from the particle interfaces. Pressure can be applied by a variety of methods. For example, hydrostatic pressure can be applied to the cell by subjecting the cell to a pressurized fluid. In another example, uniaxial pressure can be applied by sandwiching the cell between two flat plates that are bolted together with a bolt torque that provides a desired pressure on the cell.

While solid-state lithium-ion cells operated at high pressure can avoid the above-described problems, the apparatus and system used to apply high pressure adds significant volume and mass that can significantly lower the energy density of the cell, especially compared to liquid electrolyte cells, which can operate under low or no pressure.

According to one aspect of the disclosure, the solid-state lithium-ion cells described herein operate without the above-described problems at pressures at or below 1 MPa. In another aspect of the disclosure, the solid-state lithium-ion cells undergo little or no volume change during cycling. Another aspect of the disclosure is a conditioning process that that significantly improves the performance of a cell at reduced pressures.

According to various embodiments, a conditioning process involves cycling the cell at high pressure. In some embodiments, this advances the cell to a state where there is a significantly reduced change in overall cell thickness upon charge and discharge. As such, once pressure is lowered, the cell is capable of cycling more and the overall resistance of the cell increases at a rate that is far slower compared to a cell that is initially cycled at a low pressure. In some embodiments, the process involves cycling the cell at a high pressure (e.g., 1 MPa or 2 MPa or higher) and then decreasing the cell to the desired lower operating pressure. This can lead to formation of a solid-state anode microstructure that allows battery cycling to occur without significant expansion and contraction of the anode and without significant change in cell thickness. Cell operation can occur at substantially decreased pressure. This can allow a pressure fixture to be eliminated or its mass and size to be greatly reduced.

FIG. 1 is a process flow diagram showing operations in a method of conditioning a cell prior to normal operation. At 101, a solid-state lithium-ion battery cell is provided. This is typically, though not necessarily, an uncycled cell. In some embodiments, one or more previous cycles may have been performed. However, if the cell is cycled too many times prior to cycling at high pressure, it can lead to irreversible increases in the anode resistivity.

The cell may be a single layer or multilayer cell. Examples of single and multilayer cells and cell manufacturing processes are provided below.

In some embodiments, the cell includes silicon or a silicon-containing active material in its anode. Further description and examples of solid-state lithium-ion cells and the component anodes, cathodes, and separators is given below.

The conditioning process can be performed at the beginning of life, for example, when the cell is first manufactured and prior to its use in a device. In some embodiments, the conditioning process is performed during the cell assembly and manufacturing process prior to the cell being placed in a pouch or case. For instance, the conditioning process may be performed in an instrument also used to stack the cell components (i.e., multiple layers of cathode/separator/anode). The conditioning process may be performed after the cell stack has been placed in a pouch or case. While the conditioning process is typically performed prior to installation in a device, it could be performed after installation if desired.

In the method of FIG. 1, the conditioning process is performed on a previously uncycled cell. The charge capacity of the first cycle is higher (e.g., 10-100 mAh/g higher) than obtained in subsequent cycles, with the amount depending on the cell's first cycle Coulombic efficiency. This difference is due to irreversible specific capacity losses in the cathode active material, irreversible reactions between lithium and the anode active materials, and electrolyte degradation reactions that occur during the first cycle. The extra capacity is not recovered on subsequent cycles. As such, silicon active material particles undergo the highest amount of expansion on the first cycle. Suppressing expansion of the anode on the first cycle can be critical in preventing irreversible increases in the anode resistivity that lead to poor performance, capacity fade, and possibly lithium plating.

At 103, an initial cycle is performed at high pressure. The cell is electrochemically charged and discharged at a pressure that is higher than the final operating pressure. In some embodiments, the pressure applied to the cell may be 1 to 100 MPa and may be at least 2 MPa or 3 MPa. In some embodiments, it is between 2 and 10 MPa. Applied pressures less than 1 MPa may be used in embodiments in which the operating pressure is very low. In some embodiments, a ratio of applied pressured during conditioning to the operating pressure at least 1.5:1.

Pressure is defined as the amount of force applied to the active area of the cell divided by the active area of the cell. For a hydrostatic pressure fixture, pressure may be defined as the pressure of the fluid within the hydrostatic system.

Pressure can be applied to the cell in a variety of methods. For instance, pressure can be applied using a hydrostatic press, where the cell is subject to a pressurized fluid, or a uniaxial pressure, where the cell is sandwiched between two flat plates that are bolted together with a bolt torque that provides a desired pressure on the cell. Force applied to the cell by the pressure application system can be determined using a pressure gauge, a load cell, pressure paper, a two-dimensional pressure/force gauge, or computational modeling. In systems that are not set to a constant pressure, the force exerted by the system on the cell, and vice versa, may increase during the charging process, indicating that the materials within the cell are expanding and exerting force on their surroundings.

The charge and discharge processes can be galvanostatic, potentiostatic, or some combination of the two. Each charge and discharge process can be carried out until the cell reaches a predetermined voltage or current limit cutoff, until the cell has reached a desired state of charge, or until the cell has passed a predetermined amount of capacity. In some embodiments, for example, the cell is charged to less than 100% state of charge. The benchmark can change or be the same from cycle to cycle (e.g. to 30% charge, then 50% charge, etc.). The rate of current passed during charge and discharge can range from 0.02 C to 10 C in some embodiments. In some embodiments it is between 0.2 C and 5 C. The rate of current may change or be the same from cycle to cycle.

At 105, one or more additional cycles at high pressure are optionally performed. In some embodiments, operation 105 may continue until the cell thickness and/or cells resistance has plateaued.

In some embodiments, the number of cycles in a conditioning process for a particular type of cell may be determined by measuring the change in overall cell thickness or anode thickness after each charge and discharge process. In some embodiments, it may be determined by measuring the cell resistance growth over time or over the course of cycling once the pressure applied to the cell has been decreased. The number of cycles may be chosen such that the resistance at the end of each charge process has plateaued or increases at a rate far slower than the initial cycles of the conditioning process, indicating that conditioning process has reached an equilibrium.

In some embodiments, the number of cycles in operation 105 is predetermined. This can be based on conditioning processes of the same or similar type of cells. For example, one or more of thickness, cell resistance, and pressure may be measured and used to determine an optimum number of cycles.

In some embodiments, a thickness of a cell may be measured during the conditioning process. In some embodiments, the conditioning process may be carried out until the thickness of the cell no longer changes, or until the calculated thickness change of the anode is no more than a threshold (e.g., 5%) on a complete charge or discharge process. This indicates that the cell thickness has reached a state where there is little to no change in overall thickness throughout cycling.

In some embodiments, the pressure of the cell may be measured during the conditioning process. In particular, the process may be carried out until the pressure within the cell and pressure application fixture system has approached an equilibrium, wherein there is little to no change in pressure throughout charge and discharge and between cycles. This indicates that the cell thickness has reached a state where there is little to no change in overall thickness throughout cycling.

In some embodiments, the pressure applied to the cell may be measured and actively controlled during the conditioning process. For instance, the applied pressure may be varied between charge and discharge processes, and between cycles. In some embodiments, the pressure within the pressure application fixture may increase as the cell volume expands during charge and decrease during discharge. In said embodiments, the pressure applied to the cell may be controlled to maintain a desired pressure, in response to pressure changes, during charge and discharge.

The rates of current passed during each charge and discharge process can be varied from cycle to cycle in operations 103 and 105. For instance, the rate of current passed during the charge or discharge process can be decreased or increased for each subsequent cycle. The rates of current passed during the charge and discharge processes within a given cycle can be varied in operations 103 and 105. The conditioning process can also contain 'rest' steps, wherein no current is passed. The rest steps can take place during a given charge or discharge process, or between charge and discharge processes. For instance, the cell can undergo a rest step once the cell has reached a desired state of charge during a charge process, prior to subsequently being discharged.

In some embodiments, the conditioning process may be carried out at elevated temperature. Examples of include a few degrees above room temperature to 60° C., or 35° to 45°

C. Increasing the conditioning process temperature may lower the overall cell resistance, as the solid electrolyte becomes more conductive and lithium ion diffusion within active materials increases. As such, the rate of current during charge and discharge may be increased, effectively making the conditioning process faster. In some embodiments, elevating the temperature of the conditioning process may also promote adhesion between various materials within the anode. For instance, the application of heat may soften the polymer binder within the anode or soften the polymer component of the separator and/or cathode. By softening the polymer components within each cell component, densification of the cell may occur more efficiently, and adhesion within each cell component and between cell components may be improved. Certain temperatures may also have a beneficial impact on the degree of solid electrolyte interphase (SEI) layer formation, or the composition of the SEI layer.

Application of pressure during operation 103 and (if performed) 105 can result in one or more of the following advantages. Expansion of the anode thickness may be suppressed during charge, contact between electrolyte particles (within the separator, within the electrodes, and across the separator and electrode interfaces) may be maintained, the electrically conductive additive network may remain intact, and contact with silicon active material may be maintained. During discharge, application of pressure ensures that contact between active material particles and electrolyte and carbon additive particles is maintained while the active material particles shrink and potentially contract away from said particle interfaces.

At 107, the applied pressure can be removed or lowered for operation. As discussed further below, the high pressure conditioning process of operations 103 and 105 allows the cell to operate at pressure of 1 MPa or lower.

A high pressure conditioning process may also be performed at later stages of life to improve cell performance.

In some embodiments, application of high pressure during initial cycling results in an anode and/or cell microstructure that facilitates low pressure operation. For example, silicon active material particles may expand into surrounding free volume in the anode, rather than push on surrounding structures. The latter can lead to irreversible thickness expansion. Expanding into free volume does not change cell thickness. Further, it utilizes what otherwise would be dead space.

In some embodiments, application of high pressure while silicon active material particles are expanding during charge leads to active material particles having increased contact with surrounding electrolyte, binder, and conductive additive materials.

In some embodiments, application of high pressure causes silicon active material particles to exert forces on surrounding materials and environment. This can result in one or more advantages. In some embodiments, force exerted by the active material on electrolyte particles, carbon additive, polymer, and free volume that surrounds these components densifies the components. This results in an increase in free volume that can be accessed by the active material during expansion. In some embodiments, exertion of force by active material on the electrolyte particle network results in increased contact area between active material and electrolyte particles, and a contact interface that is more conformal and more adhesive. In some embodiments, exertion of force pushes electrolyte particles together, which improves their connectivity and the anode's ionic conductivity.

In some embodiments, preventing or significantly limiting anode thickness expansion through initial application of high pressure causes the anode to internally apply pressure to the anode/separator interface and cathode/separator interface. This may improve adhesion and contact between the anode/separator and cathode/separator interfaces. This may also apply pressure to electrode components at the current collector interface, or a prime layer on the surface of the current collector, effectively improving adhesion between the anode and the anode current collector. Internal application of pressure by the anode may also densify the separator and cathode, which is beneficial for cell performance. Densification of the cathode may improve contact between electrolyte particles and transition metal oxide cathode active material particles that undergo small (e.g., 2-3%) volume changes upon lithiation/delithiation. Densification of the separator and cathode (which may initially be porous) may also increase the fraction of free volume within the overall cell that is present in the anode. This effectively increases the free volume within which anode active material can expand and contract without increasing/decreasing the overall cell thickness.

During discharge, application of pressure also ensures that contact between active material particles and electrolyte and carbon additive particles is maintained while the active material particles shrink and potentially contract away from these particle interfaces. This can be particularly important during the first complete charge and discharge when the overall volume expansion may be highest.

Application of pressure may also be advantageous during the initial solid electrolyte interphase (SEI) layer formation process. In some embodiments, for example, by pressing silicon active material particles and solid electrolyte particles together, more SEI layer may be formed, which can be helpful in creating ionically conductive pathways between solid electrolyte particles and active material particles.

One of more of the above-described effects of a high pressure conditioning process can result in formation of an anode and cell microstructure and composition that is beneficial to the ability of the cell to operate at low pressure.

In some embodiments, a conditioned battery cell is characterized by having an overall cell microstructure that allows the cell to cycle at low pressure with significantly improved performance capabilities and significantly reduced change in overall cell thickness during charge/discharge. Features of the anode microstructure can include having highly densified and tightly packed areas of solid electrolyte particles, anode active material particles, polymer binder, and carbon additive that are surrounded by voids. These materials may remain in very close contact with each other, even after complete discharge of the cell. The surrounding voids provide space for silicon active material particles to expand and contract without altering the electrode thickness.

In some embodiments, the cell is characterized by having silicon active materials that are well adhered to solid electrolyte particles and that have conformal interfaces with solid electrolyte particles. Such interfaces improve the transport of lithium ions within the electrode and to the silicon active material particles and improve adhesion between materials. As such, contact between solid particles can be maintained throughout the expansion/contraction of silicon active material.

In some embodiments, an anode is characterized by having concentrated domains of solid electrolyte particles. The particles in a domain may be fused together. The anode may also have concentrated domains of active material.

In some embodiments, the cell and/or anode microstructure is distinctly different from a microstructure formed when the cell is initially cycled at low pressure. In such cells, solid electrolyte particles and anode active material particles are not in concentrated domains, and solid electrolyte particles and active material particles are significantly surrounded by void space. Such a microstructure has reduced contact between solid electrolyte particles and active material particles and lower electrical and ionic conductivity.

Electrode Compositions

The anode is characterized by being a non-lithium metal anode. It is a composite film that includes an active material, an electrolyte, and a binder. In some embodiments, a conductive additive may be used. In some embodiments, a conductive additive may be omitted.

The cathode is also a composite film that includes an active material, an electrolyte, and a binder. In some embodiments, a conductive additive may be used. In some embodiments, a conductive additive may be omitted.

Examples of anode active materials include graphite, silicon, carbon coated silicon, carbon structures embedded with silicon, silicon alloys (e.g., silicon alloyed with one or more of Al, Zn, Fe, Mn, Cr, Co, Ni, Cu, Ti, Mg, Sn, and Ge), silicon oxides (e.g. $SiO_x$ where $0 \leq x \leq 2$), lithium titanium oxide, similar anode active materials or combinations thereof.

Examples of cathode active materials include lithium nickel manganese cobalt oxide ($LiNi_xMn_yCo_zO_2$) ("NMC") where (x=0.8, y=0.1, z=0.1; x=0.6, y=0.2, z=0.2; x=0.5, y=0.3, z=0.2; or x=0.1, y=0.1, z=0.1), lithium nickel cobalt aluminum oxide ($LiNi_xCo_yAl_zO_2$) ("NCA") where (x=0.80, y=0.15, z=0.05), lithium manganese oxide ($LiMn_2O_4$) ("LMO"), lithium iron phosphate ($LiFePO_4$) ("LFP"), lithium sulfide ($Li_2S$), elemental sulfur ($S_8$), lithium cobalt oxide ($LiCoO_2$), iron (II) fluoride ($FeF_2$), iron (III) fluoride ($FeF_3$), cobalt (II) fluoride ($CoF_2$), similar cathode active materials or combinations thereof.

Both the cathode and anode may independently include a carbon additive to provide electrical conduction such as graphene, activated carbons, carbon fibers carbon black, Ketjen black, acetylene black, carbon nanotubes, graphite, C-ENERGY SUPER C65, C-ENERGY SUPER C45, SUPER P Li carbon black, or similar. In some embodiments, a conductive additive may be omitted. For example, a conductive additive may be omitted in some embodiments in which carbon-coated silicon or a silicon-carbon composite is used as the active material in the anode.

The electrodes may have a binder to provide electrode cohesion and adhesion strength. The binder is generally an organic polymer. Examples of binders include styrene butadiene rubber (SBR), styrene-isoprene-styrene (SIS), styrene-ethylene-butylene-styrene (SEBS), carboxymethyl cellulose (CMC), poly-acrylic acid (PAA), nitrile rubber (NBR), fluorinated block copolymers such as polyvinylidene fluoride (PVDF), or similar block copolymers. Further examples of polymers are provided below in the discussion of the separator. According to various embodiments, the polymer may or may not be an ionic conductor. Examples of polymers that are ionically conductive include poly(ethylene oxide) (PEO) and PEO-based block copolymers having lithium salts dissolved in them.

Each of the anode and cathode electrolyte may be an inorganic electrolyte. It may be an oxide-based composition, a sulfide-based composition, or a phosphate-based composition, and may be crystalline, partially crystalline, or amorphous. In certain embodiments, the inorganic phase may be doped to increase conductivity. Examples of solid lithium ion conducting materials include perovskites (e.g., $Li_{3x}La_{(2/3)-x}TiO_3$, $0 \leq x \leq 0.67$), lithium super ionic conductor (LISICON) compounds (e.g., $Li_{2+2x}Zn_{1-x}GeO4$, $0 \leq x \leq 1$; $Li_{14}ZnGe_4O_{16}$), thio-LISICON compounds (e.g., $Li_{4-x}A_{1-y}B_yS_4$, A is Si, Ge or Sn, B is P, Al, Zn, Ga; $Li_{10}SnP_2S_{12}$), garnets (e.g. $Li_2La_3Zr_2O_{12}$, $Li_5La_3M_2O_{12}$, M is Ta or Nb); NASICON-type Li ion conductors (e.g., $Li_{1.3}Al_{0.3}Ti_{1.2}(PO_4)_3$), oxide glasses or glass ceramics (e.g., $Li_3BO_3$—$Li_2SO_4$, $Li_2O$—$P_2O_5$, $Li_2O$—$SiO_2$), argyrodites (e.g. $Li_6PS_5X$ where X=Cl, Br, I), sulfide glasses or glass ceramics (e.g., $75Li_2S$-$25P_2S_5$, $Li_2S$—$SiS_2$, $LiI$—$Li_2S$—$B_2S_3$) and phosphates (e.g., $Li_{1-x}Al_xGe_{2-x}(PO_4)_3$(LAGP), $Li_{1+x}Ti_{2-x}Al_x(PO_4)$). Further examples include lithium rich anti-perovskite (LiRAP) particles. As described in Zhao and Daement, Jour J. Am. Chem. Soc., 2012, 134 (36), pp 15042-15047, incorporated by reference herein, these LiRAP particles have an ionic conductivity of greater than $10^{-3}$ S/cm at room temperature.

Examples of solid lithium ion conducting materials include sodium super ionic conductor (NASICON) compounds (e.g., $Na_{1+x}Zr_2Si_xP_{3-x}O_{12}$, $0 < x < 3$). Further examples of solid lithium ion conducting materials may be found in Cao et al., Front. Energy Res. (2014) 2:25 and Knauth, Solid-state Ionics 180 (2009) 911-916, both of which are incorporated by reference herein.

Further examples of ion conducting glasses are disclosed in Ribes et al., J. Non-Cryst. Solids, Vol. 38-39 (1980) 271-276 and Minami, J. Non-Cryst. Solids, Vol. 95-96 (1987) 107-118, which are incorporated by reference herein.

In some embodiments, the solid electrolytes are argyrodites. The argyrodites may have the general formula: $A_{7-x}PS_{6-x}Hal_x$ where A is an alkali metal and Hal is selected from chlorine (Cl), bromine (Br), and iodine (I).

In some embodiments, the argyrodite may have a general formula as given above, and further be doped. An example is argyrodites doped with thiophilic metals:

$$A_{7-x-(z*m)}M^z{}_mPS_{6-x}Hal_x$$

wherein A is an alkali metal; M is a metal selected from manganese (Mn), iron (Fe), cobalt (Co), nickel (Ni), copper (Cu), zinc (Zn), and mercury (Hg); Hal is selected from chlorine (Cl), bromine (Br), and iodine (I); z is the oxidation state of the metal; $0 < x \leq 2$; and $0 < y < (7-x)/z$. In some embodiments, A is lithium (Li), sodium (Na) or potassium (K). In some embodiments, A is Li. Metal-doped argyrodites are described further in U.S. patent application Ser. No. 16/829,962, incorporated by reference herein. In some embodiments, the composite may include oxide argyrodites, for example, as described in U.S. patent application Ser. No. 16/576,570, incorporated by reference herein.

Alkali metal argyrodites more generally are any of the class of conductive crystals of cubic symmetry that include an alkali metal. This includes argyrodites of the formulae given above as well as argyrodites described in US Patent Publication No. 20170352916 which include $Li_{7-x+y}PS_{6-x}Cl_x+_y$, where x and y satisfy the formula $0.05 \leq y \leq 0.9$ and $-3.0x+1.8 \leq y \leq -3.0x+5$, or other argyrodites with $A_{7-x+y}PS_{6-x}Hal_{x+y}$ formula. Such argyrodites may also be doped with metal as described above, which include $A_{7-x+y-(z*m)}M^z{}_mPS_{6-x}Hal_{x+y}$.

In some embodiments, the active material particles may first be coated by solid electrolyte prior to mixing a slurry, to improve contact between the active material and solid electrolyte.

For cathode compositions, the table below gives examples of compositions.

| Constituent | Active material | Inorganic conductor | Electronic conductivity additive | Organic phase |
|---|---|---|---|---|
| Examples | Transition Metal Oxide | Argyrodites (e.g., $Li_6PS_5Cl$, | Carbon-based Activated | Hydrophobic block copolymers having soft and |
| | NCA | $Li_{5.6}PS_{4.6}Cl_{1.4}$, | carbons | hard blocks |
| | NMC | $Li_{5.4}M_{0.1}PS_{4.6}Cl_{1.4}$, | CNTs | PVDF and SEBS |
| | LFP | $Li_{5.8}M_{0.1}PS_5Cl$, | Graphene | PMMA and SEBS |
| | Sulfur | $Na_{5.8}M_{0.1}PS_5Cl$ | Graphite | Nylon and SEBS |
| | | Sulfide glasses or | Carbon fibers | SEBS |
| | | glass ceramics | Carbon black | SIS |
| | | (e.g., | (e.g., Super C) | PMMA |
| | | $75Li_2S•25P_2S_5$) | | PVDF |
| | | $Li_{10}GeP_2S_{12}$ | | PS-PVDF |
| | | (LGPS) | | PVDF grafted with PS |
| | | | | NBR |
| | | | | Grafted SEBS with polar polymer blocks |
| Wt % range | 65%-88% | 10%-33% | 1%-5% | 1%-5% |

For anode compositions, the table below gives examples of compositions.

| Constituent | Primary active material | Secondary active material | Inorganic conductor | Electronic conductivity additive | Organic phase |
|---|---|---|---|---|---|
| Examples | Silicon oxide Si—C composites Elemental Si Si alloys, e.g., Si alloyed with one or more of Al, Zn, Fe, Mn, Cr, Co, Ni, Cu, Ti, Mg, Sn, Ge Graphite Sn | Graphite | Argyrodites (e.g., $Li_6PS_5Cl$, $Li_{5.6}PS_{4.6}Cl_{1.4}$, $Li_{5.4}M_{0.1}PS_{4.6}Cl_{1.4}$, $Li_{5.8}M_{0.1}PS_5Cl$, $Na_{5.8}M_{0.1}PS_5Cl$ Sulfide glasses or glass ceramics (e.g., $75Li_2S\bullet25P_2S_5$) $Li_{10}GeP_2S_{12}$ (LGPS) | Carbon-based Activated carbons CNTs Graphene Carbon fibers Carbon black (e.g., Super C) | Hydrophobic block copolymers having soft and hard blocks PVDF and SEBS PMMA and SEBS Nylon and SEBS CMC and PAA PAA PVA SEBS SIS NBR PVDF PS-PVDF PVDF grafted with PS Grafted SEBS with polar polymer blocks |
| Wt % range | Si is 15%-50% | 5%-40% | 10%-60% | 0%-5% | 1%-5% |

Separator

The separator may include a composite material including a polymeric phase and solid electrolyte particles that conduct alkali ions. In some embodiments, solid electrolyte particles are responsible for all of the ion conductivity of the composite material, providing ionically conductive pathways through the composite material. In other embodiments, an ionically conductive polymer may be used.

Examples of solid electrolytes are described above with reference to the electrolytes that may be used in the electrode compositions.

In some embodiments, the polymer phase has substantially no ionic conductivity, and is referred to as "non-ionically conductive." Non-ionically conductive polymers described herein have ionic conductivities of less than 0.0001 S/cm. In some embodiments, the organic phase may include a polymer that is ionically conductive in the present of a salt such as LiTFSI. Ionically conductive polymers such as polyethylene oxide (PEO), polypropylene oxide (PPO), polyacrylonitrile (PAN), poly(methyl methacrylate) (PMMA), dissolve or dissociate salts such as LiTFSI. Non-ionically conductive polymers do not dissolve or dissociate salts and are not ionically conductive even in the presence of a salt. This is because without dissolving a salt, there are no mobile ions to conduct.

Examples of polymers that may be used are provided in U.S. Patent Publication No. 2021/0194039, incorporated by reference herein. These include styrene-butadiene-styrene (SBS), styrene-isoprene-styrene (SIS), styrene-ethylene/propylene-styrene (SEPS), styrene-ethylene/butylene-styrene (SEBS), styrene butadiene rubber (SBR), ethylene propylene diene monomer (EPDM) rubber, polybutadiene (PBD), polyethylene (PE), polypropylene (PP), and polystyrene (PS). In some embodiments, the polymer binder includes SEBS modified with maleic anhydride (SEBS-gMA). In some embodiments, the polymer binder includes SEBS modified with furfurylamine (SEBS-gFA).

In some embodiments, the solid-phase separators consist essentially of ion-conductive inorganic particles and an organic phase. However, in alternative embodiments, one or more additional components may be added to the solid separators.

According to various embodiments, the solid compositions may or may not include an added salt. Lithium salts (e.g., LiPF6, LiTFSI), potassium salts, sodium salts, etc. can be added to improve ionic conductivity in embodiments that include an ionically conductive polymer such as PEO. In some embodiments, the solid-state compositions include substantially no added salts. "Substantially no added salts" means no more than a trace amount of a salt. In some embodiments, the ionic conductivity of the composite is substantially provided by the inorganic particles. Even if an ionically conductive polymer is used, it may not contribute more than 0.01 mS/cm, 0.05 mS/cm. or 0.1 mS/cm to the ionic conductivity of the composite. In other embodiments, it may contribute more.

In some embodiments, the solid-state separator may include one or more conductivity enhancers. In some embodiments, the electrolyte may include one or more filler materials, including ceramic fillers such as $Al_2O_3$. If used, a filler may or may not be an ion conductor depending on the particular embodiment. In some embodiments, the composite may include one or more dispersants. Further, in some embodiments, an organic phase of a solid-state composition may include one or more additional organic components to facilitate manufacture of an electrolyte having mechanical properties desired for a particular application.

In some embodiments, the separator composition may include an electrode stabilizing agent that can be used to form a passivation layer on the surface of an electrode. Examples of electrode stabilizing agents are described in U.S. Pat. No. 9,093,722. In some embodiments, the electrolyte may include conductivity enhancers, fillers, or organic components as described above.

A separator film may be of any suitable thickness depending upon the particular battery or other device design. For many applications, the thickness may be between 1 micron and 250 microns, for example 15 microns. In some embodiments, the electrolyte may be significantly thicker, e.g., on the order of millimeters.

Example Embodiments

Figure 2:
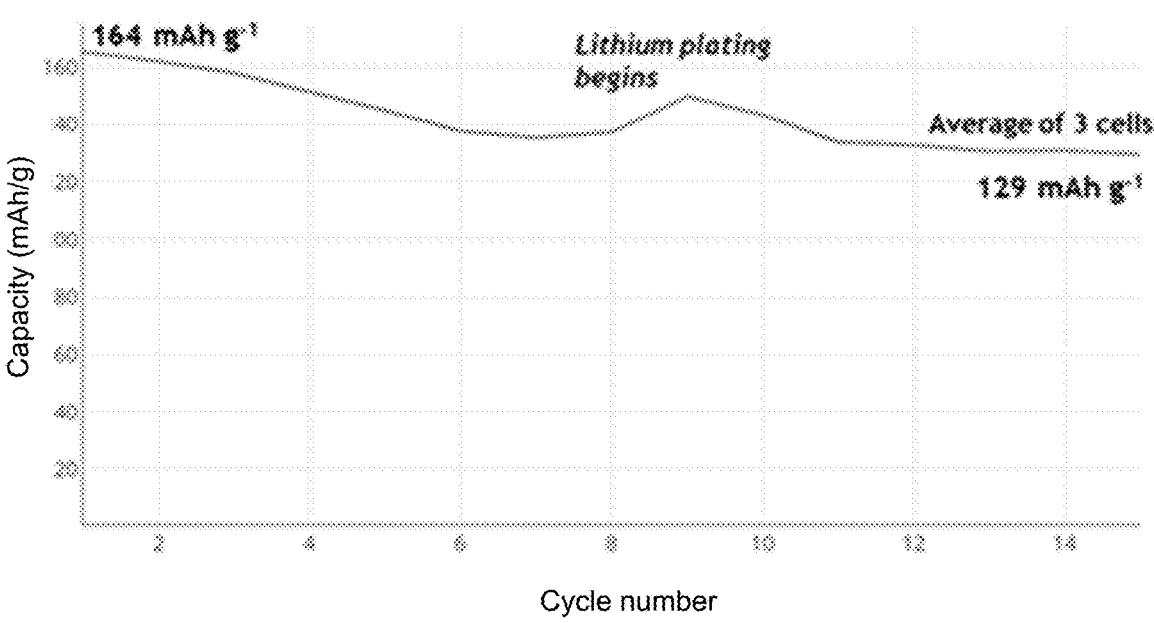
FIG. 2 and FIG. 3 are charts showing the average discharge capacity for cells cycled at different pressure conditions.
Figure 3:
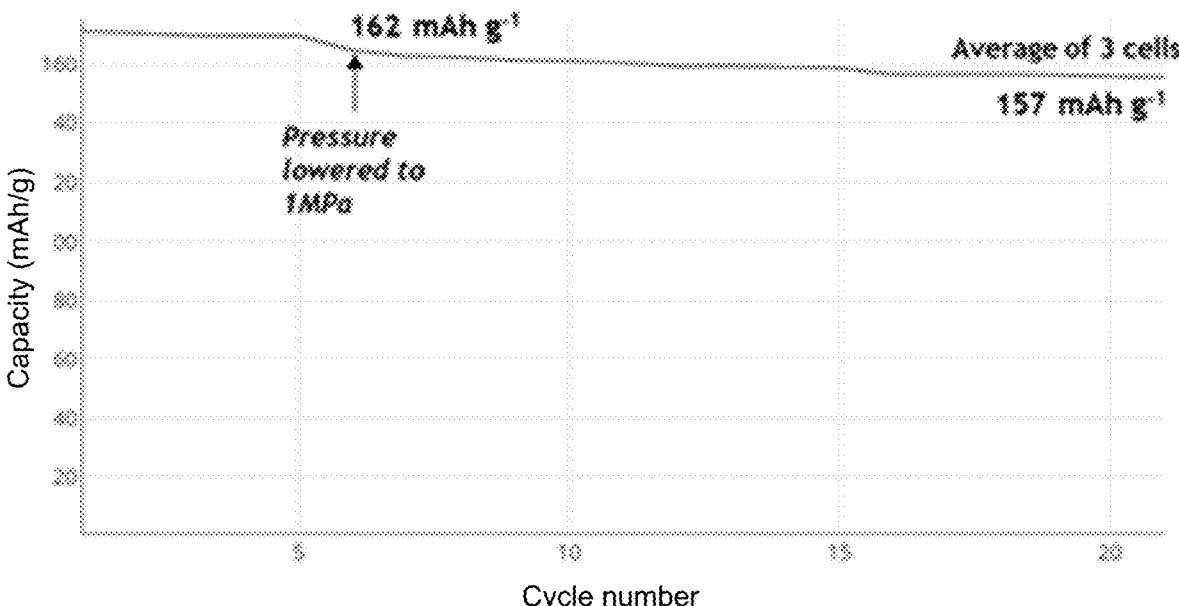

FIG. 2 and FIG. 3 show the average discharge capacity for cells cycled at 1 MPa (FIG. 2) and cells that were first cycled at 3 MPa and decreased to 1 MPa (FIG. 3). At the beginning of cycling, the average discharge capacity obtained for the 1 MPa cells was 164 mAh/g, while the average first cycle discharge capacity for cells at 3 MPa was 170 mAh/g (6 mAh/g higher). The discharge capacity of the 1 MPa cells begins to quickly drop, and lithium plating begins after 8-10 cycles. After 15 cycles, the average discharge capacity for the 1 MPa cells is only 129 mAh/g, which corresponds to approximately 1.4% capacity loss per cycle. Once the pressure of the 3 MPa cells was decreased to 1 MPa after the $5^{th}$ cycle, the average capacity decreased to only 157 mAh/g after 15 cycles at 1 MPa, which correspond to approximately 0.2% capacity loss per cycle. The capacity retention of cells cycled at 1 MPa that underwent the conditioning process was over 5 times greater than cells that did not undergo the conditioning process.

Figure 4:
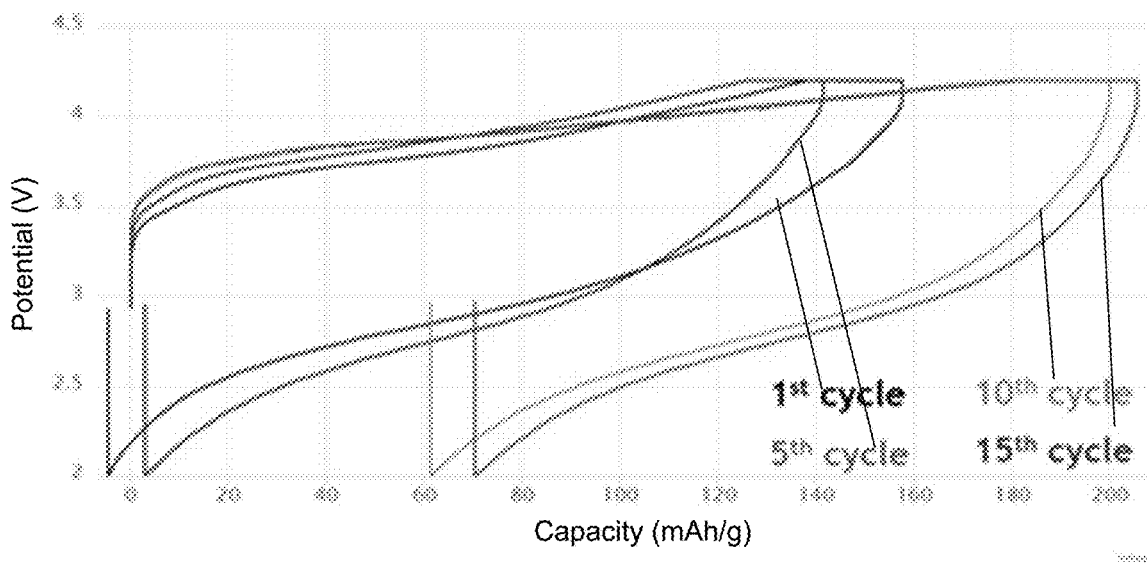
FIG. 4 shows the charge and discharge voltage profiles for one of the battery cells cycled to generate the discharge capacity represented in FIG. 2.

FIG. 4 shows the charge and discharge voltage profiles for one of the battery cells cycled to generate the discharge capacity represented in FIG. 2. Cycling at 1 MPa from the beginning of life leads to a significant increase in the charge potential and a decrease in the discharge potential, indicating that the cell resistance increases rapidly. This is also accompanied by an overall decrease in cell capacity going from Cycle 1 to Cycle 5. The voltage profile on Cycle 10 shows significant evidence of lithium plating (i.e. noise in the output voltage, a long drawn out charging process, and a very low discharge capacity and Coulombic efficiency on the subsequent discharge). This indicates that the anode has become overly resistive as a result of the expansion and contraction process in the anode.

Figure 5:
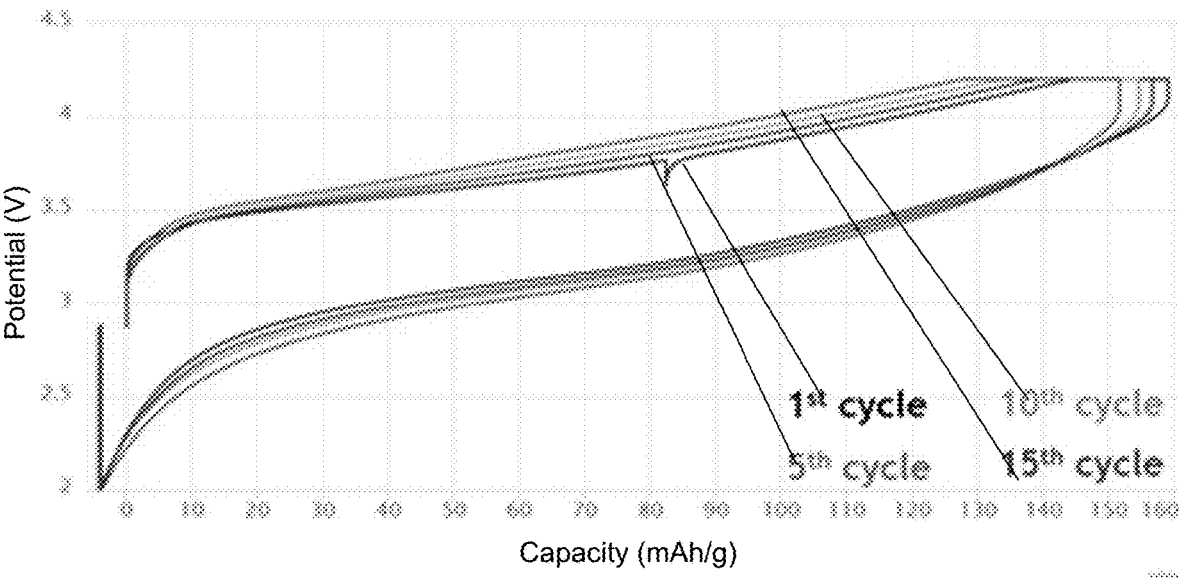
FIG. 5 illustrates the voltage profile of cells cycled at high pressure and then decreased to lower pressure.

FIG. 5 illustrates the voltage profile of cells cycled at high pressure and then decreased to lower pressure. As shown, the charge and discharge voltage profiles are very similar during the high pressure process (Cycles 1 and 5). Once the pressure is decreased, the voltage required to charge the cell and the voltage obtained during discharge undergo slight changes, indicating that the cell may be slightly more resistive. However, this change is significantly less drastic when compared to the changes observed in FIG. 4 for the 1 MPa cells. This indicates the initial high pressure conditioning process led to an overall cell microstructure that is less resistive, and that is capable of better withstanding a resistance increase that would be associated with expansion and contraction of silicon.

Figure 6:
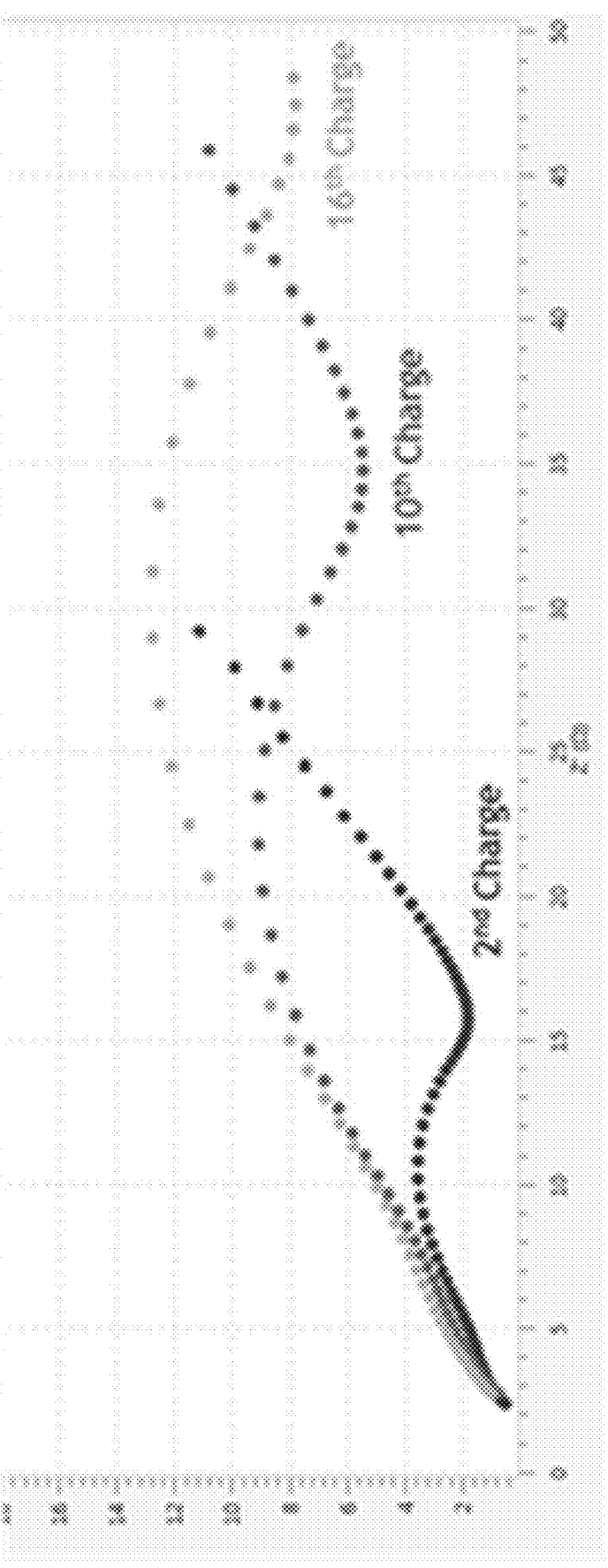
FIG. 6 is a plot showing electrochemical impedance spectroscopy (EIS) results for EIS performed at 50% state of charge for a cell cycled at 1 MPa.
Figure 7:
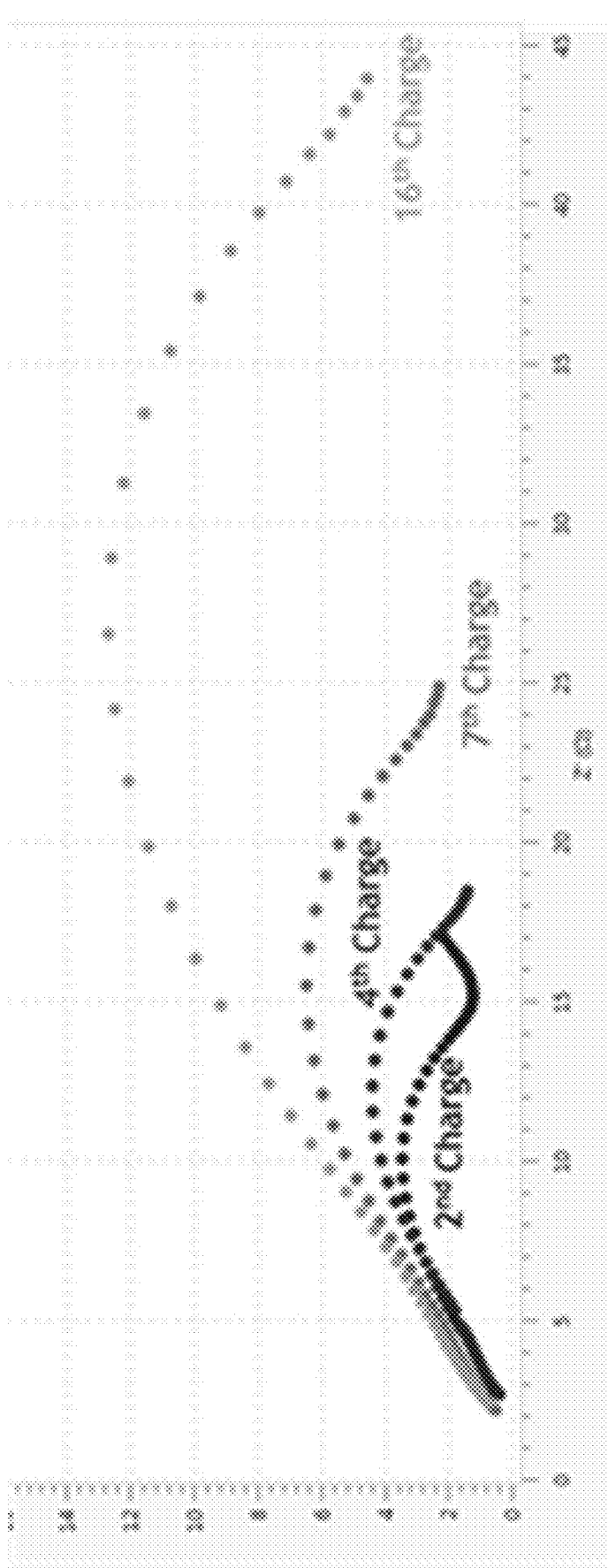
FIG. 7 is a plot showing electrochemical impedance spectroscopy (EIS) results for EIS performed at 50% state of charge for a cell first cycled at 3 MPa and then cycled at 1 MPa.

The rise in cell resistance when cells are started at a lower pressure is also shown in the electrochemical impedance spectroscopy (EIS) measurements. FIGS. 6 and 7 show Nyquist plots that represent the various resistances within a cell started at 1 MPa, and a cell started at 3 MPa and then lowered to 1 MPa. EIS was measured for each cell at 50% state of charge, pausing the cells during the charge procedure.

For each impedance spectrum, the left most x-axis intercept represents the cell's Ohmic resistance; the left most, high frequency semicircle can be attributed to the charge transfer resistance within the anode; the semicircle second from the left can be attributed to the charge transfer resistance of the cathode; and the right most tail represents the Warburg impedance (i.e., lithium ion diffusion within active materials). The impedance profiles were fit using EC-Lab and the charge transfer resistance values for the anode were extracted.

Impedance values are summarized for the 2nd and 16th cycle for each cell in the below Table. Electrochemical impedance spectroscopy determined cell resistances for a cell cycled at 1 MPa and a cell cycled at 3 MPa then lowered to 1 MPa after the $5^{th}$ cycle, respectively, are shown. Charge transfer resistance in the anode ($R_{CT1}$), charge transfer resistance in the cathode ($R_{CT2}$), and total cell resistance ($R_{total}$) 1 are shown.

| Applied Pressure | Cycle status | $R_{CT1}$ (Ω) | $R_{CT2}$ (Ω) | $R_{total}$ (Ω) |
|---|---|---|---|---|
| 1 MPa | $2^{nd}$ Charge (1 MPa) | 2.07 | 11.48 | 15.98 |
| | $16^{th}$ Charge (1 MPa) | 5.36 | 39.39 | 47.53 |
| 3 MPa then 1 MPa | $2^{nd}$ Charge (3 MPa) | 1.48 | 11.05 | 15.22 |
| | $16^{th}$ Charge (1 MPa) | 3.29 | 38.06 | 44.04 |

As shown, the anode charge transfer resistance (RCT1) for the cell cycled at 1 MPa increases significantly compared to the cell first cycled at 3 MPa, going from 2.07Ω to 5.36Ω between Cycles 2 and 16. For the cell cycled at 3 MPa and decreased to 1 MPa, the charge transfer resistance in the anode is less significant, going 1.48Ω to 3.29Ω between Cycles 2 and 16. In this particular cell composition, the overall resistance ($R_{total}$) is substantially influenced by the charge transfer resistance in the cathode (RCT2), due to potential side reactions between the electrolyte and cathode active material.

Figure 8A:
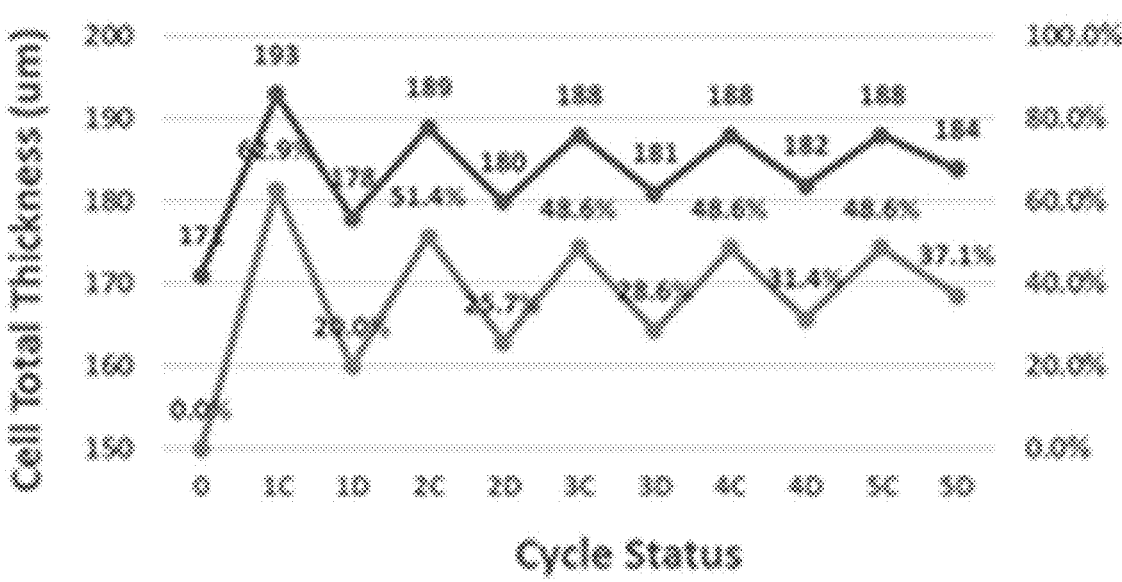
FIG. 8A shows measured cell thickness and the percentage increase in thickness over a cycle for a cell during a conditioning process at 1 MPa.
Figure 8B:
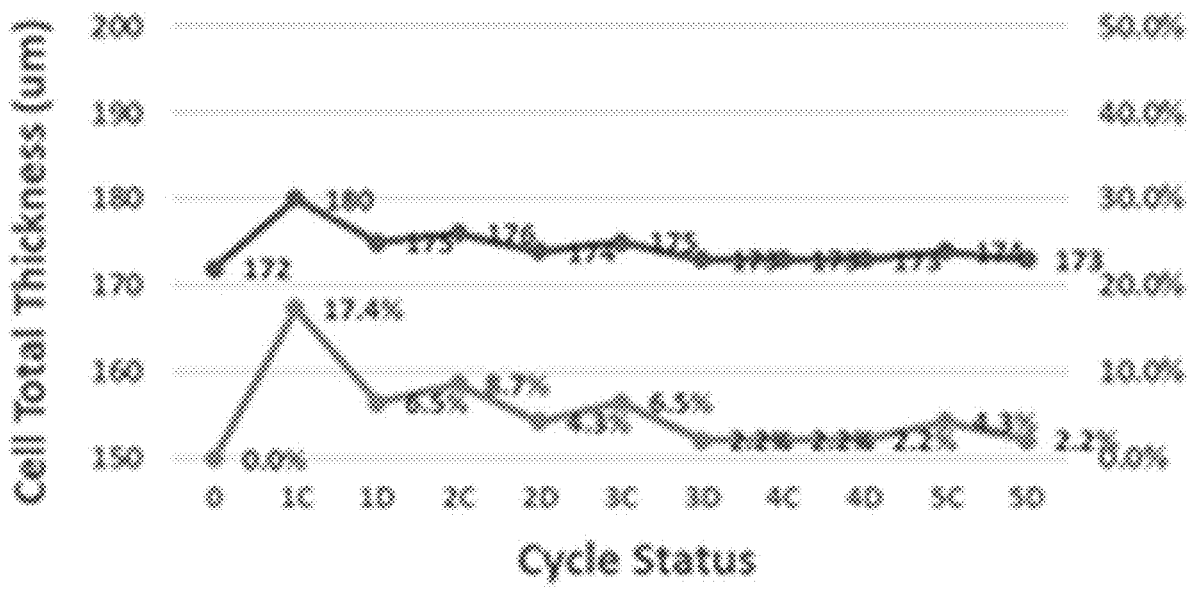
FIG. 8B shows measured cell thickness and the percentage increase in thickness over a cycle for a cell during a conditioning process at 3 MPa.

Cell thickness was measured at the end of charge and at the end of discharge for cells cycling at 1 MPa and at 3 MPa. The measured cell thickness and the percentage increase in thickness is shown in FIG. 8A for the 1 MPa cell and in FIG. 8B for the 3 MPa cell. The below discussion assumes that the thickness change is due solely to change in anode thickness. FIG. 8A shows that cells cycled at 1 MPa undergo a significant volume expansion upon the first charge, with the overall anode thickness increasing by 62.9%. Comparatively, the high pressure cell undergoes only 17.4% % thickness increase during the first charging process. This difference indicates that application of higher pressure (3 MPa) resists the electrode expansion. After the first discharge, the 1 MPa cell thickness decreases to a thickness that is effectively 20% greater than its original thickness, while the high pressure cell thickness decreases to 6.5% greater than its original thickness. This suggests that silicon particles of the 1 MPa cell are not fully delithiated, consistent with the observed decrease in obtained discharge capacity. This also suggests that the pressure applied to the cells is not high enough to systematically decrease the anode free volume while the active material particle size decreases during discharge. The 3 MPa cell returns to a significantly lower anode thickness. (Silicon active material particles are not expected to fully return to their original volume upon first discharge. This is because the silicon active material may undergo irreversible reactions with lithium that may irreversibly increase particle size. Additionally, the amount of capacity achieved on the first charge may exceed the amount of capacity that can subsequently be stored by the cathode active material. This is because the NMC particles may undergo irreversible structural changes and parasitic reactions with the solid electrolyte that effectively change the NMC specific capacity.)

On subsequent cycles, the 1 MPa cell continue to undergo large expansion and contraction in volume, changing by 20-30% on Cycles 2, 3, and 4. The thickness of the anode at the end of charge remains nearly constant for each cycle, while the anode thickness after discharge continuously rises with each cycle. The continuous rise in thickness may be attributed to the following: an increasing amount of silicon active material that remains lithiated at the end of discharge, an increase in electrode and cell resistance, and possible lithium plating that may lead to irreversible lithium loss. For this cell in particular, lithium plating began on Cycle 3.

The thickness changes observed on subsequent cycles for the 3 MPa cell were unexpected. During the second charge (2C), the anode thickness increases by only 2.2%, which is far lower than the change observed at 1 MPa (31.4%). On the following discharge process (2D), the anode decreases to 4.3%, which is lower than the previous discharge state thickness. On the third cycle, the cell thickness only increases by 2.2% during charge, and decreases by 4.3% upon discharge, again decreasing to a lower thickness then the initial thickness before the cycle began. This reduction in thickness indicates that the applied pressure, combined with the expansion/contraction of particles allows the anode to achieve a higher packing density during cycling. Afterward, the cell thickness then continues to hover between a thickness only 2.2-4.3% greater than its original thickness, undergoing little to no change on subsequent cycles. The amount of anode thickness change for Cycles 2-5 is about 1-2 μm per charge/discharge, within the range of experimental error.

To compare the cells, the cells cycled at 3 MPa had an anode thickness increase of only 17.4% on first charge compared to 62.9% for cell cycled at 1 MPa. By the third cycle, the charged anode thickness is only 2-4.5% thicker than the starting anode thickness for the 3 MPa cell compared to 48-51% thicker for a 1 MPa cell, and the 3 MPa anode undergoes 0-2% overall volume expansion/contraction for each cycle, compared to 20-30% volume expansion at 1 MPa.

The cell performance results above demonstrate that initial cycling at 3 MPa allows cells to achieve an average discharge capacity of 157 mAh/g after 15 cycles at 1 MPa, compared to cells that started at 1 MPa, which maintained only 129 mAh/g after 15 cycles and experienced lithium plating. This suggests that the high pressure cycling process creates an overall anode and cell microstructure that allows silicon active material particles to expand and contract in a way that better utilizes the void space within the anode, and that ultimately minimizes the overall change of the anode and cell thickness.

The amount that an anode is expected to expand during charge depends on several parameters: the ratio of the anode capacity to cathode capacity (the "n/p ratio"), the porosity of the anode ($\rho_a$), the weight percentage of silicon active material in the anode ($w_{Si}$), and the amount of expansion that the silicon active material is expected to undergo during lithiation—typically reported as a total expected percentage growth at 100% lithiation, which is an intrinsic property of the chosen anode active material, denoted as $f_{exp}$.

The original volume of the anode active material present in the anode, and prior to any charging of the cell, can be denoted as $V_0$. The final volume of the anode active material at 100% SOC can be denoted as $V_{100}$. The total free volume within the anode (i.e. the porosity, or void fraction) can be denoted as $V_f$.

One can calculate the overall growth in active material volume going from 0% state of charge (SOC) to 100% SOC (i.e., charging the cell) by subtracting $V_0$ from $V_{100}$, which can be denoted as $V_d$. In some embodiments, the n/p ratio, $\rho_a$ $w_{si}$, and $f_{exp}$ can be engineered such that $V_d$ is expected to be less than $V_f$. For instance, an anode can be manufactured to be sufficiently porous. Unlike in traditional lithium-ion cells that contain a liquid electrolyte, the anode active material in the cells described herein can theoretically expand within the pore space of the anode without impacting the overall anode thickness. However, without the application of pressure, the silicon active material would still expand in a way that increases the overall thickness of the anode during charge. By application of high pressure during initial cycling, one restricts the ability of the anode thickness to increase, and instead forces the anode active material to utilize $V_f$. As such, by using the high pressure conditioning process described herein, and by designing the anode to have an expected $V_d$ that is less than $V_f$, one can achieve a solid-state cell that undergoes minimal, if not any, amount of thickness change during cycling. This enables one to apply significantly lower amounts of pressure throughout cycling.

Cell energy density may be higher in cases where $V_d$ is greater than $V_f$, for instance when the n/p ratio is between 1.0-1.2, and in instances where initial anode porosity is low. In such embodiments, the anode thickness is expected to increase and decrease during charge and discharge. While this expansion and contraction of the anode is unavoidable, the high pressure conditioning processes described herein minimize the degree to which active material expansion leads to overall anode thickness growth. That is, one can condition the cell and the anode microstructure to better utilize $V_f$.

The porosity of the anode may be controlled during a densification process during cell manufacturing, for instance, when the anode is passed through a calender press or heat press. The amount of force applied to the anode, or the gap through which the anode is passed through calendaring rolls can be controlled to achieve varying levels of porosity. For example, high force can be used to densify the film to a low porosity, and a lower force can be used to achieve a higher porosity.

The n/p ratio can be controlled by varying the ratio of area-specific capacity of the anode and cathode. A high n/p ratio can be obtained by having a high anode area-specific capacity, and a low cathode area-specific capacity. For example, an n/p ratio of 2.0 can be obtained by having a cathode area-specific capacity of 3.0 mAh/cm², and an anode loading of 6.0 mAh/cm². The desired area-specific capacity for each electrode can be achieved during the manufacturing process, for instance, by controlling the overall thickness of each electrode during the coating of an electrode slurry, and/or increasing or decreasing the weight percentage of active material present in each electrode. High area-specific capacity can be achieved by producing thick electrodes and/or electrodes with high active material weight percentages.

The area-specific capacity can be calculated by determining the capacity of an electrode, and dividing by the area of the electrode film. The capacity of electrode can be determined by measuring the mass of the electrode film, multiplying this mass by the weight percentage of the active material in the electrode to obtain the mass of active material present, and then multiplying by the specific capacity of the active material.

Without initially cycling silicon-based solid-state cells at high pressures (i.e. above 1 MPa), it is difficult or impossible to cycle at lower pressures (equal to or less than 1 MPa) without premature failure. This is because an initial, unrestricted, expansion of the anode leads to irreversible changes to the anode microstructure that causes rapid capacity fade, resistance growth, and potentially lithium plating. This is illustrated in FIGS. 2, 3, and 8.

In some embodiments, a cell is determined to be a self-contained cell. Such a cell can be obtained by a high-pressure condition process as described above. A "self-contained" cell is a cell that, after conditioning, minimize the degree to which active material expansion leads to overall anode thickness and anode resistance growth. A self-contained cell may be obtained using the conditioning processes described herein.

In some embodiments, a solid-state lithium-ion battery cell is identifiable as a self-contained cell by applying a test including cycling the solid-state lithium-ion battery cell at a first pressure, cycling an identical cell at a second pressure higher than the first pressure but otherwise identical conditions, and comparing the capacity loss of the cells. In some embodiments, the cell is identifiable as self-contained cell if the capacity is loss is less than 5 times greater than that of the cell cycled at the second pressure. In some embodiments, it may be less than 3 times greater than that of the cell cycled at the second pressure. In some embodiments, the first pressure is 1 MPa and the second pressure is 3 MPa.

In some embodiments, the cell is identifiable as a self-contained cell if the percent capacity loss per cycle (PCLPC) is less than 5 times greater than that of the cell cycled at the second pressure. In some embodiments, it may be less than 3 times greater.

In some embodiments, a self-contained cell may be determined using the following test:

1) Obtain two identical solid-state lithium-ion batteries having silicon-containing active material.
2) Cycle one obtained battery for twenty cycles at a rate of C/5, to full depth of discharge, at a temperature 25° C., and an operating pressure of 1 MPa. Cycle the other obtained battery twenty times at a rate of C/5, to full depth of discharge, at a temperature 25° C., and an operating pressure of 3 MPa.
3) Calculate the percent of capacity lost per cycle by taking the total capacity lost over the 20 cycles and dividing it by 20 and by the cell's expected capacity. This number is multiplied by 100 to obtain the percent of capacity loss per cycle. The cell's expected capacity is as provided by the manufacturer or as determined as described below.
4) Compare the percent capacity lost per cycle for the cell cycled under 1 MPa operating pressure to that of the cell cycled under 3 MPa cell operating pressure.
5) If the value for the 1 MPa cell is less than 5 times greater than the value for the 3 MPa cell, then the cell is identified as a self-contained cell.

Identical refers to substantially identical batteries made by substantially identical manufacturing processes (including cell assembly and conditioning) and having substantially identical usage. Two commercial batteries sold as identical batteries from the same manufacturing process and having undergone the same usage (e.g., both obtained as-sold before usage) would qualify, for example.

To cycle a battery at 1 MPa or 3 MPa, a cell can be sandwiched between two flat plates bolted together with a bolt torque that provides the desired pressure on the cell. The required bolt torque may be predetermined using a two-dimensional pressure gauge to measure the pressure applied over the area of the cell. A fixture having flexible compression may be used to hold pressure constant. Such fixtures have springs between the two flat plates to allow expansion.

As noted above, an expected capacity can be provided by the manufacturer. Alternatively, the expected capacity for the cells can be determined by fully charging and discharging a cell fixtured at 3 MPa at a temperature of 25° C., at a constant current charge of C/20, followed by constant current discharge to full depth of discharge. This procedure may be performed on 3 or more cells to obtain an average expected capacity.

Figure 9:
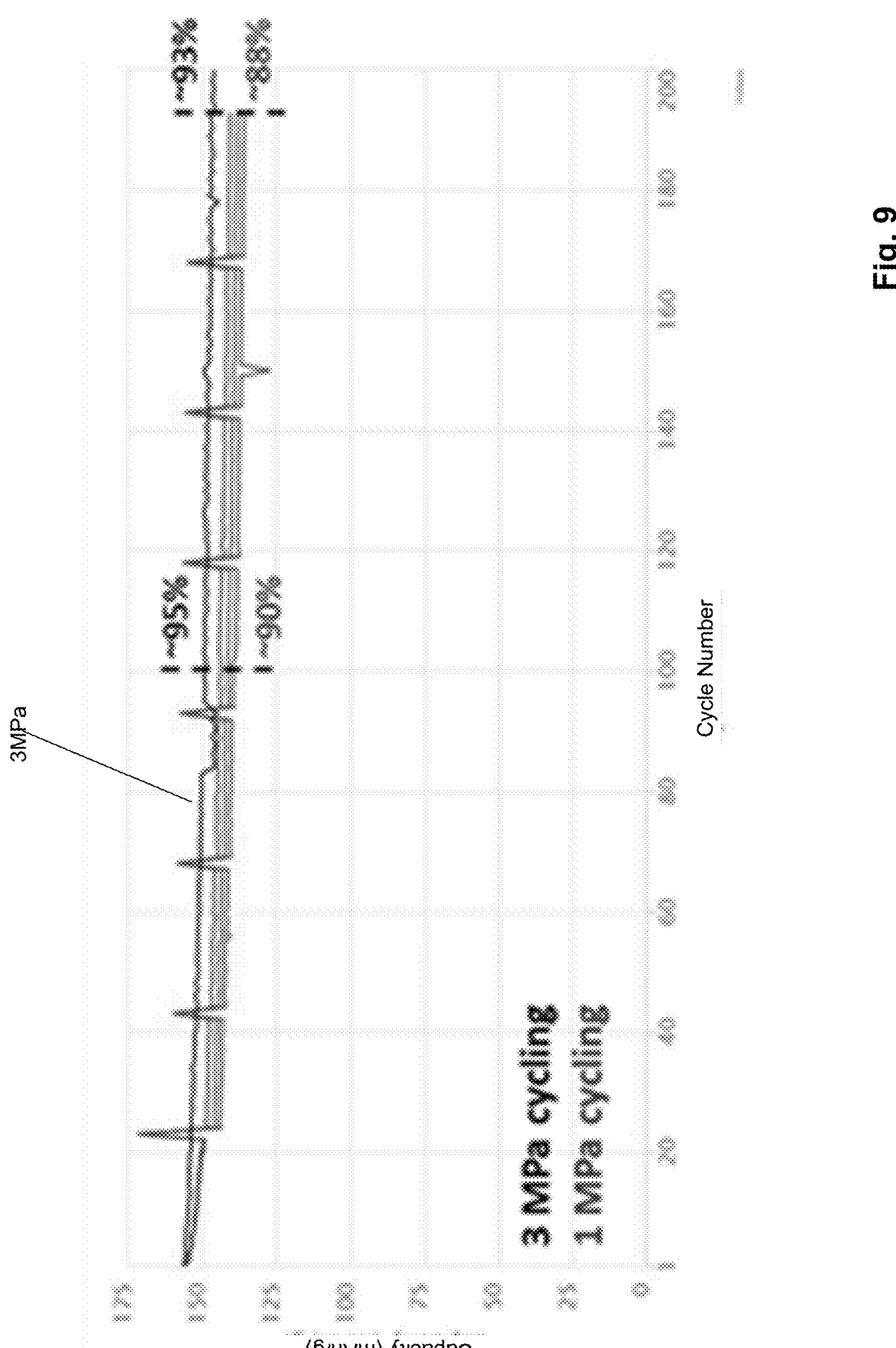
FIG. 9 shows capacity per cycle for self-contained cells operated under 1 MPa compared to a reference self-contained cell operated under 3 MPa.

FIG. 9 shows the cycling performance for identical, fully dry solid-state batteries produced by Blue Current. The batteries contain an anode including a silicon active material and a cathode including a transition metal oxide active material. The top curve represents the specific discharge capacity obtained for one cell that was cycled at an operating pressure set to 3 MPa. The three red curves represent the specific discharge capacity obtained for three cells that were cycled at an operating pressure set to 1 MPa, and that underwent an initial high pressure conditioning process prior to cycling. The conditioning process for these three cells was carried out at a temperature of 28° C. (±1° C.) and included five full cycles, all performed at 3 MPa of pressure, and with the following cycling conditions: charge was performed using a constant current procedure at a rate of C/5, following by a constant voltage charge step at the voltage limit of 4.2 V, with the constant voltage step being carried out until the charging current was equal to a C/20 current limit; discharge was performed at C/5, with a lower voltage cutoff of 2.0 V.

The cycle life tests illustrated in FIG. 9 were carried out at a temperature of 28° C. (±1° C.), and with the following cycling parameters: charge was performed using a constant current procedure at a rate of C/5, following by a constant voltage charge step at the voltage limit of 4.2 V, with the constant voltage step being carried out until the charging current was equal to a C/20 current limit; discharge was performed at C/5, with a lower voltage cutoff of 2.0 V. In addition, the lower pressure cells underwent one slower cycle every 25 cycles, at a constant current charge and discharge rate of C/20 in order to examine the cells state of health (SOH) throughout cycling.

The cells were sandwiched between two flat plates that were bolted together with a bolt torque that provides the desired pressure on the cell. The required bolt torque was predetermined using a two-dimensional pressure gauge to measure the pressure applied over the area of the cell.

As shown in FIG. 9, the cell continuously cycling at 3 MPa had 0.05% capacity loss per cycle compared to 0.1% loss for identical cells cycling at 1 MPa. The percent capacity loss per cycle is only 2 times higher for the 1 MPa cells than for the 3 MPa cell. Identical cells cycled at 1 MPa without any high-pressure conditioning process rapidly lose capacity and fail at early stages of cycling and have a percent capacity lost per cycle greater than 5 times the 3 MPa value. These cells would also pass the similar test described above and be identified as self-contained cells.

Cell Manufacturing

Examples of manufacturing processes for solid-state lithium-ion batteries are described below with respect to FIGS. 10-14.

Figure 10:
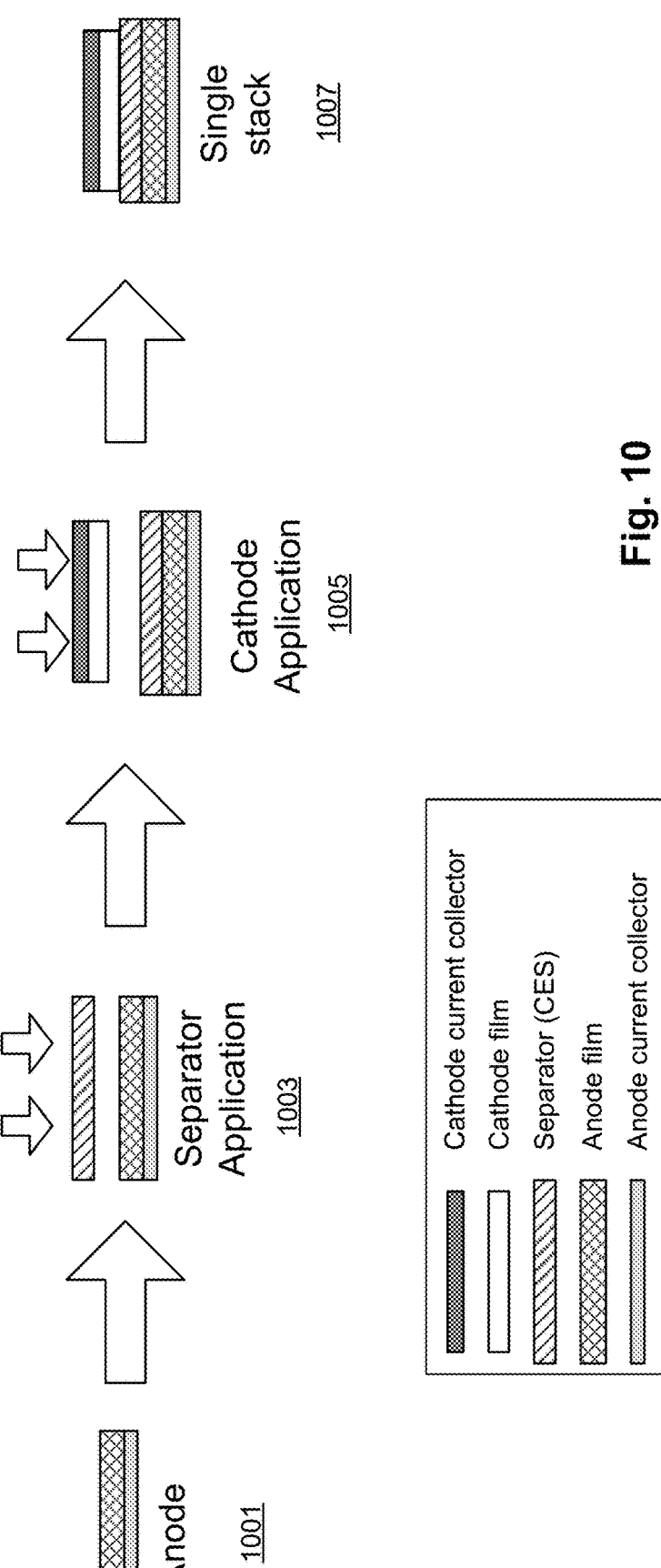

FIG. 10 shows a schematic of how a solid-state battery may be assembled. First, at 1001, an anode film on a current collector is shown. At 1003, a solid-state electrolyte separator is applied to the anode using a technique such as lamination, casting, or extrusion. A current collector/cathode film stack is applied (e.g., by lamination, casting, or extrusion) to the current collector/anode/separator stack at 1005. This results in a single cell stack 1007. Stacking multiple cell stacks can be used to form a battery that contains multiple cell elements (cathode/separator/anode) in a stack. However, stacking multiple units like cell stack 1007 results in lower energy density.

Figure 11:
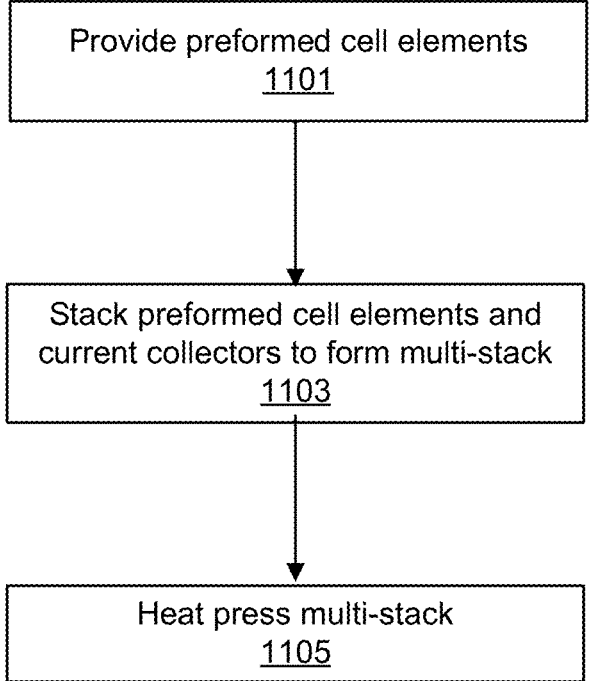
FIG. 11 is a process flow diagram showing certain operations in a method of forming a multilayer solid-state lithium-ion battery.

FIG. 11 is a process flow diagram showing certain operations in a method of forming a multilayer solid-state lithium-ion battery. First, in an operation 1101, preformed cell elements are provided. The preformed cell elements are stacked in an operation 1103 to form a multilayer cell. As described further below, the preformed cell elements are laminated and densified to form a densified unit. In some embodiments, the preformed cell elements are densified electrode/separator/double-sided electrode/separator/electrode units that are layered with current collectors in operation 1103. In other embodiments, a current collector is included on only one end of the preformed cell element to form a densified electrode/separator/double-sided electrode/separator/electrode/current collector unit, which is stacked in operation 1103. Schematic examples of each of these embodiments are shown with reference to FIGS. 12 and 13 below.

The cathode current collector may have a thin layer of conductive adhesive that improves adhesion to the adjacent electrode films. In embodiments in which a double-side cathode is part of the preformed cell element, the preformed cell element includes the conductive adhesive. In embodiments in which the cathode current collector is layered with the preformed cell elements, the conductive adhesive may be provided as additional layers in the stack or pre-applied to the cathode current collector.

Similarly, the anode current collector may have thin layer of conductive adhesive. In embodiments in which a double-side anode is part of the preformed cell element, the preformed cell element includes the conductive adhesive. In embodiments in which the anode current collector is layered with the preformed cell elements, the conductive adhesive may be provided as additional layers in the stack or pre-applied to the anode current collector.

Returning to FIG. 11, the multilayer cell is then heat pressed in an operation 1105. In some embodiments, all of the pre-formed elements are layered and then heat pressed at one time. In other embodiments, operations 1103 and 1105 are repeated one or more times to build the stack up one element or a subset of elements at a time.

Figure 12:
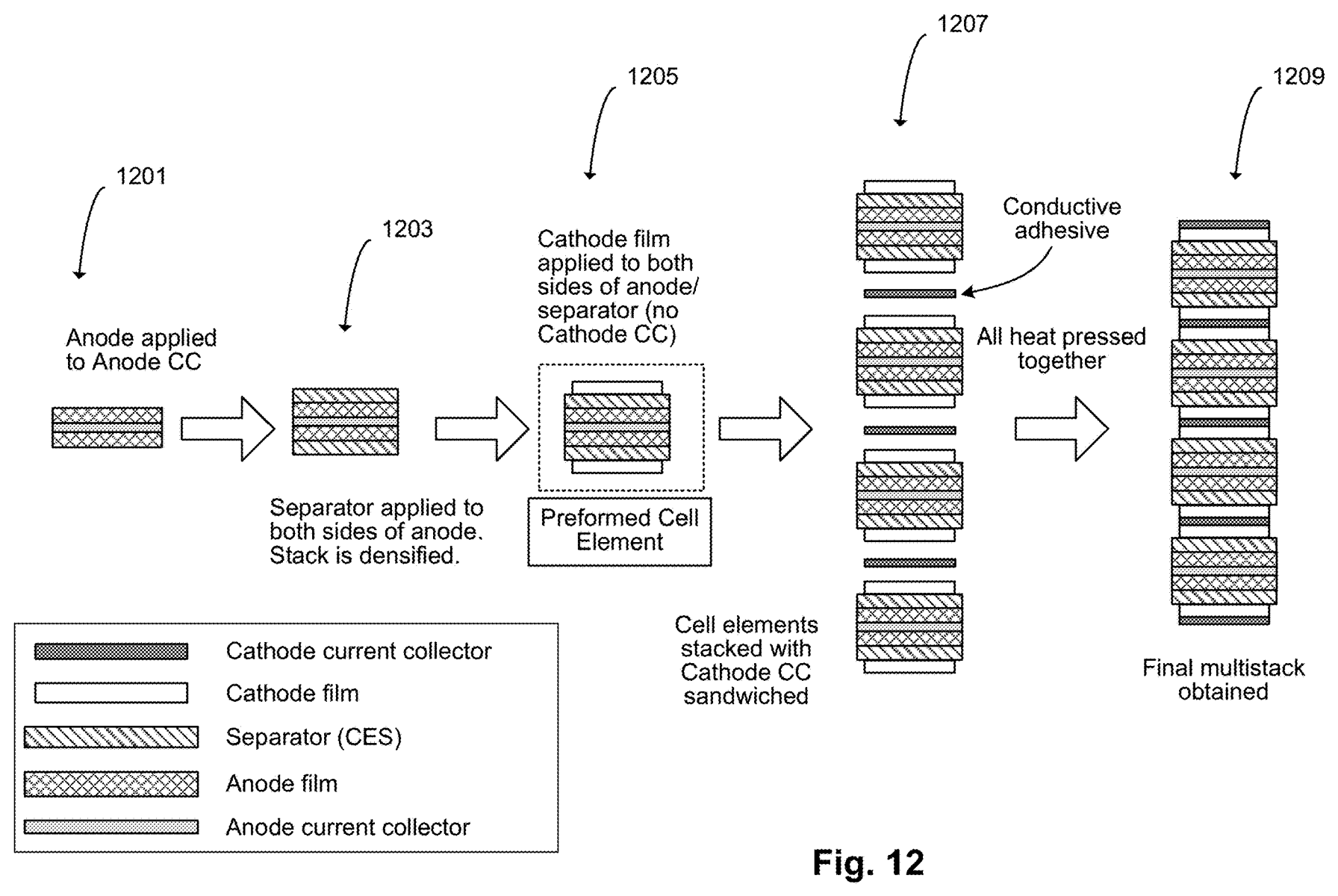

FIG. 12 is a schematic illustration of a process of manufacturing a multilayer solid-state lithium-ion battery in which the preformed cell elements are electrode/separator/double-sided electrode/separator/electrode units. At 1201, anode films are applied to both sides of an anode current collector to form a double-sided anode. At 1203, a separator film is applied to both sides of the anode. The stack is densified, e.g., by calender roll press. At 1205, a cathode film is applied to both sides the anode/separator. This forms the preformed cell element to be stacked in the multilayer cell-stack. At 1207, the preformed cell elements are stacked with cathode current collectors sandwiched between. In the example shown, the current collector is provided with a conductive adhesive coating on each side. Then, at 1209 the stack is heat pressed to form the final multilayer cell.

Figure 13:
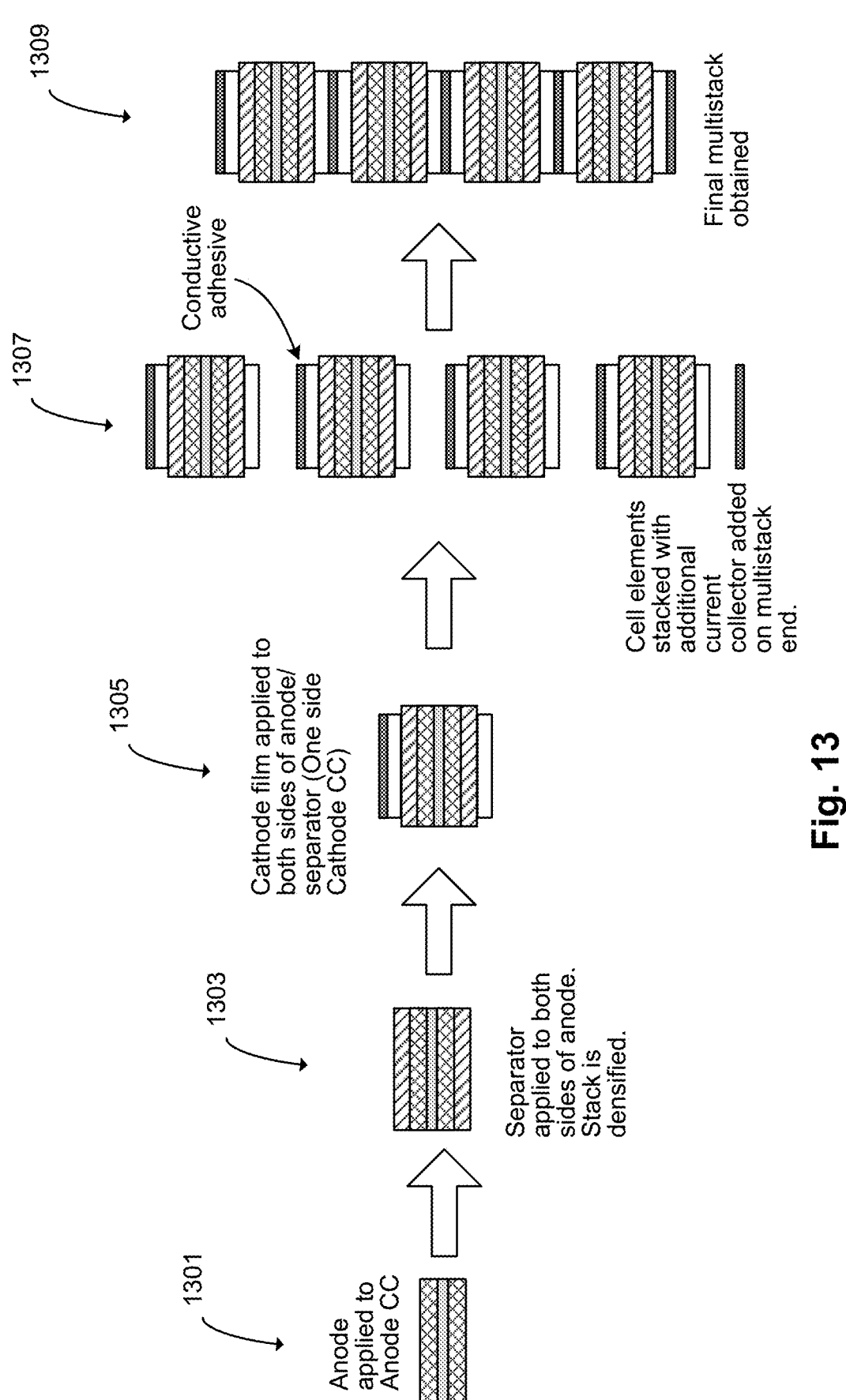

FIG. 13 is a schematic illustration of a process of manufacturing a multilayer cell solid-state lithium-ion battery in which the preformed cell elements are electrode/separator/double-sided electrode/separator/electrode/current collector units. Operations 1301 and 1303 are performed as described above with respect to operations 1201 and 1203 in FIG. 12. At 1305, a cathode film is applied to both sides the anode/separator (as in operation 1305) and a current collector is applied to one side of the stack. This forms the preformed cell element to be stacked in the multilayer cell. At 1307, the preformed cell elements are stacked. In the example shown, the current collector is provided with a conductive adhesive coating each side. A single cathode current collector is added to the end of the stack having the exposed cathode. Then, at 1309 the stack is heat pressed to form the final multilayer cell.

The solid-state electrodes and electrolyte separator described herein are composite films. The composite electrolyte separator films may be fabricated by mixing inorganic particles with an organic polymer. Examples of composite films are described further below.

FIG. 14 is a process flow diagram showing certain operations in a method of forming a preformed cell element. In the example shown in FIG. 14, the preformed cell element includes a double-sided anode. First at an operation 1401, a non-lithium-metal composite film is applied to both sides of an anode current collector. Examples of non-lithium-metal active materials include graphite and silicon. In the example of FIG. 14, the anode is a composite film and also includes organic polymer as a binder, as well as a solid electrolyte. A conductive additive may also be present.

Operation 1401 may involve a slurry casting process, where dry solid components of the electrode are mixed with an appropriate solvent and cast on to a substrate. In some embodiments, the electrode is cast on to a current collector film or onto a release film to be transferred to the current collector film. Slurry coating processes include doctor blade coating, slot die coating, spray coating, screen printing, and gravure coating. Alternatively, the dry solid components of the electrode may be formed into a sheet via a dry, solvent-less extrusion process. The electrode film may then be applied to the current collector using a calender press, hot press, or similar technique.

In some embodiments, a conductive adhesive is disposed between the anode film and the anode current collector. If used, the conductive adhesive is applied to the anode current collector before application of the anode composite film. In some embodiments, commercially available metallic foil coated with the conductive adhesive may be used. In other embodiments, the conductive adhesive may be applied prior to operation 1401. Examples of conductive adhesives are given further below.

At operation 1403, an optional densification and/or surface treatment of the anode composite films of the double-sided anode can be performed. A densification process can be performed using a vertical heat press, calender roll press, or other technique. In some embodiments, wherein the anode films are densified prior to separator application, the anode film surfaces may be embossed, roughened, or otherwise physically treated to provide a higher contact area for the separator film to promote adhesion and high interfacial ionic conductivity.

At 1405, a composite electrolyte separator (CES) is applied to both sides of the double-sided anode. In many embodiments, the CES is a composite film of an ionically conductive inorganic particulate phase in an organic polymer phase as described above. The CES film may be prepared through traditional slurry cast processes, where dry solid components of the separator are mixed with an appropriate solvent and cast on to a substrate. Alternatively, the dry solid components of the separator may be formed into a sheet via a dry, solvent-less extrusion process. In some embodiments, the separator is cast on a release film and transferred to the electrode surface. In some embodiments, the separator is directly cast on to the electrode surface. Slurry coating processes include doctor blade coating, slot die coating, spray coating, screen printing, gravure coating, and similar methods. If the separator is formed as a free-standing film, the separator is laminated directly to the anode using a calender press. If the separator is formed as a composite film on a release film, the separator is transferred to the anode surface using a calender press, and the release film then removed. Application of the separator film is performed using a calender press, as this provides uniform distribution of pressure. Example thicknesses of the separator may be between 1 micron and 250 microns, for example 15 microns, or 5 to 10 microns, after the separator is applied to the anode and densified.

After the separator is applied to the electrode surfaces, the CES/anode/current collector/anode/CES stack is densified prior to application of the subsequent electrode films in an operation 1407. Performing the densification step prior to application of the other electrode films results in improved performance.

In some embodiments, CES film may be embossed, roughened, or surface treated to provide a higher contact area for the composite cathode film to promote adhesion and high interfacial ionic conductivity in an optional operation 1408.

Composite cathode film is applied to surface of both separator films, i.e. the top and bottom of the cell element in an operation 1409. Cathode films may be prepared through traditional slurry cast processes, where dry solid components of the electrode are mixed with an appropriate solvent and cast on to a substrate. In some embodiments, the electrode is cast on to a substrate such as a release film and applied to the separator surface or cast directly on to the separator surface. Slurry coating processes include doctor blade coating, slot die coating, spray coating, screen printing, gravure coating, or similar methods. Alternatively, the dry solid components of the electrode may be formed into a sheet via a dry, solvent-less extrusion process. The cathode film may then be applied to the separator surface using a calender press, vertical plate press, or similar technique.

If the cathode film is first deposited on a substrate, such as a release film, it may or may not be densified prior to being transferred to the separator film surface. In some embodiments, it may be embossed, roughened, or surface treated to provide a higher contact area for the separator film to promote adhesion and high interfacial ionic conductivity.

After operation 809, the cathode/CES/anode/current collector/anode/CES/cathode cell element is formed. It may be densified and/or the cathode film may be embossed, roughened, or otherwise treated in an optional operation 1411. The preformed cell element is ready to be stacked with cathode current collectors as described with reference to FIG. 11.

The process described above with reference to FIG. 14 may be modified with the anode and cathode operations switched, such that the assembly of the preformed cell element begins with element begins with the double-sided cathode, followed by separator application to the cathode, and so on. In this case, the preformed cell elements are stacked with anode current collectors.

Also as described above with reference to FIG. 13, the process of FIG. 14 may be modified to apply a current collector to one of the two electrode surfaces after operation 1409 or 1411.

In another embodiment, the stacking process can involve two types of preformed cell elements: one type having outermost electrode films with current collector applied to their surface, and a second type, wherein the outermost electrode films do not have current collector applied to their surface. This method allows both types of preformed cell elements to be formed continuously and uniformly with a calender press. The elements are then pressed together during the stacking process.

The stacking process for the embodiments described above involve taking preformed cell elements, and in some embodiments, current collector foil, and heat pressing the stack of cell elements and current collector foils together.

This can be performed all at once, or it can be performed one-by-one. Example heat press temperatures range from 25° C. to 200° C., and in some embodiments between 80° C. to 150° C. By application of heat and pressure to the multilayer cell, the electrode film can be pressed into the surface of the current collector.

As described above, in some embodiments, a current collector laminated during the stacking process has a thin layer of a conductive adhesive on its surface that improves adhesion to the electrode film. By applying heat during the stacking process, the cathode or anode film, as well as the conductive adhesive on the surface of the current collector film is allowed to soften, which improves adhesion between the two components. This process may be performed at a pressure ranging from 0.5 MPa to 200 MPa, and in some embodiments between 1 MPa to 40 MPa.

CONCLUSION

The foregoing describes the instant invention and its certain embodiments. Numerous modifications and variations in the practice of this invention are expected to occur to those skilled in the art. For example, while the above specification describes electrolytes and electrodes for alkali ion or alkali metal batteries, the compositions described may be used in other contexts. Further, the batteries and battery components described herein are no limited to particular cell designs. Such modifications and variations are encompassed within the following claims.

The invention claimed is:

1. A method comprising:
providing a solid-state lithium-ion battery cell comprising an anode film, the anode film comprising particles of anode active material in contact with particles of inorganic solid electrolyte;
performing a high-pressure conditioning process comprising a plurality of charge/discharge cycles wherein an applied pressure between 2 and 10 MPa is maintained on the solid-state lithium-ion battery cell; and
removing the applied pressure, wherein after removing the applied pressure, the cell is conditioned for operation.

2. The method of claim 1, wherein after removing the applied pressure, the cell is conditioned for an operation at an operating pressure and a ratio of the applied pressure to the operating pressure is at least 1.5:1.

3. The method of claim 1, wherein the high-pressure conditioning process is performed until a cycle-to-cycle percent thickness change of the cell measured in a fully discharged state is less than a threshold amount.

4. The method of claim 1, wherein a cell thickness measured in the fully discharged state is less than 5% greater than a cell thickness in the fully discharged state prior to the high-pressure conditioning process being performed.

5. The method of claim 1, wherein the high-pressure conditioning process is performed until a cycle-to-cycle percent resistance change of the cell is less than a threshold amount.

6. The method of claim 1, wherein the applied pressure is constant throughout the high-pressure conditioning process.

7. The method of claim 1, wherein the applied pressure is varied between the 2 and 10 MPa during the high-pressure conditioning process.

8. The method of claim 1, wherein a charge process of a cycle is performed until the cell has reached a predetermined level of a one of a) voltage; b) a current, c) a desired state of charge, or d) an amount of capacity.

9. The method of claim 8, wherein the predetermined level varies over at least two cycles.

10. The method of claim 1, wherein the anode active material comprises silicon.

11. The method of claim 10, wherein the anode active material comprises at least one of elemental silicon, a silicon oxide, a silicon alloy, and a silicon-carbon composite.

12. The method of claim 1, wherein the solid-state lithium-ion battery comprises a separator comprising a polymer and inorganic solid electrolyte particles.

13. The method of claim 8, wherein a charge process of a subsequent cycle is performed at a rate of current higher than the first cycle.

14. The method of claim 1, wherein the high-pressure conditioning process is performed until a cycle-to-cycle percent change of a pressure measured within a cell pressure fixture is less than a threshold amount.

15. The method of claim 1, wherein the applied pressure is uniaxial.

16. The method of claim 1, wherein the contact between the particles of anode active material and the particles of inorganic solid electrolyte is maintained during the high-pressure conditioning process.

17. The method of claim 1, wherein a contact area between the particles of anode active material in contact with the particles of inorganic solid electrolyte is increased during the high-pressure conditioning process.

18. The method of claim 1, wherein after the high-pressure conditioning process, the anode film comprises densified areas of inorganic solid electrolyte particles and anode active material particles surrounded by void space.

19. The method of claim 1, wherein the anode film further comprises a polymer binder.

20. The method of claim 19, wherein after the high-pressure conditioning process, the anode film comprises densified areas of inorganic solid electrolyte particles, anode active material particles, and polymer binder surrounded by void space.

21. The method of claim 1, wherein the particles of anode active material are in conformal contact with the particles of inorganic solid electrolyte.

22. The method of claim 1, wherein after removing the applied pressure, the cell is conditioned for operation at an operating pressure of less than 2 MPa.

23. The method of claim 1, wherein after removing the applied pressure, the cell is conditioned for operation at an operating pressure less than the applied pressure.

* * * * *